(12) United States Patent
Panjwani et al.

(10) Patent No.: US 8,069,250 B2
(45) Date of Patent: Nov. 29, 2011

(54) ONE-WAY PROXY SYSTEM

(75) Inventors: Dileep Kumar Panjwani, San Jose, CA (US); Rohit K. Toshniwal, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1636 days.

(21) Appl. No.: 11/117,756

(22) Filed: Apr. 28, 2005

(65) Prior Publication Data
US 2006/0248582 A1    Nov. 2, 2006

(51) Int. Cl.
*G06F 15/16* (2006.01)
(52) U.S. Cl. ......... 709/227; 709/224; 709/228; 709/229
(58) Field of Classification Search ............ 709/227
See application file for complete search history.

(56) References Cited

U.S. PATENT DOCUMENTS

| | | | |
|---|---|---|---|
| 5,941,988 A | 8/1999 | Bhagwat et al. | |
| 5,961,605 A | 10/1999 | Deng et al. | |
| 6,473,406 B1* | 10/2002 | Coile et al. | 709/227 |
| 6,822,955 B1 | 11/2004 | Brothers et al. | |
| 6,823,372 B1 | 11/2004 | Kreiner et al. | |
| 6,853,617 B2 | 2/2005 | Watson et al. | |
| 7,296,073 B1* | 11/2007 | Rowe | 709/227 |
| 2002/0016851 A1* | 2/2002 | Border | 709/234 |
| 2003/0043788 A1* | 3/2003 | Hasegawa et al. | 370/352 |
| 2004/0034826 A1* | 2/2004 | Johansson | 714/752 |
| 2004/0260801 A1* | 12/2004 | Li | 709/223 |
| 2005/0063303 A1* | 3/2005 | Samuels et al. | 370/229 |

OTHER PUBLICATIONS

Jacobson et al., TCP Extensions for High Performance, Request for Comments (RFC) 1323, Network Working Group, May 1992.*
M. Chatel, "Classical versus Transparent IP Proxies," Request for Comments: 1919, Nework Working Group, pp. 1-35 (Mar. 1996).

* cited by examiner

*Primary Examiner* — Patrice Winder
*Assistant Examiner* — Neeraj Utreja

(57) ABSTRACT

A one-way proxy system is provided that supports one-way analysis of a transport control protocol (TCP) data stream. The one-way proxy system is used to intercept a TCP data link between two respective TCP endpoints. A one-way analyzer such as a one-way content filter, virus scanner, or firewall may be used to analyze a TCP data stream that is intercepted by the one-way proxy system. The one way proxy system preserves TCP options and TCP properties associated with the TCP packets in the TCP data stream, so that an existing TCP session between the TCP endpoints can survive in the event of a hardware bypass operation. The one-way proxy has a low overhead because significant TCP processing of the TCP data stream is only required in one direction.

20 Claims, 27 Drawing Sheets

| PACKET NO. | TIME STAMP AT B' | TIME STAMP AT B |
|---|---|---|
| P1 | 11 | 101 |
| P2 | 12 | 102 |
| P3 | 13 | 103 |
| P4 | 14 | 104 |
| P5 | 15 | 15 |

(PRIOR ART)
FIG. 5

| PACKET NO. | TIME STAMP AT B' | TIME STAMP AT B |
|---|---|---|
| P1 | 11 | 11 |
| P2 | 12 | 12 |
| P3 | 13 | 13 |
| P4 | 14 | 14 |
| P5 | 15 | 15 |

FIG. 6

| PACKET NO. | TIME STAMP AT B' | TIME STAMP AT B |
|---|---|---|
| P1 | 11 | 11 |
| P2 | 12 | 13 |
| P3 | 13 | 13 |
| P4 | 14 | 14 |

FIG. 7

| INCOMING PACKET NO. | TIME STAMP AT B' | OUTGOING PACKET NO. | TIME STAMP AT B |
|---|---|---|---|
| P1 | 11 | P1 | 101 |
| P2 | 12 | P2 | 102 |
| P3 | 13 | P3 | 103 |
| – | – | P31 | 103.5 |
| P4 | 14 | P4 | 104 |

(PRIOR ART)

FIG. 8

| INCOMING PACKET NO. | TIME STAMP AT B' | OUTGOING PACKET NO. | TIME STAMP AT B |
|---|---|---|---|
| P1 | 11 | P1 | 11 |
| P2 | 12 | P2 | 12 |
| P3 | 13 | P3 | 13 |
| – | – | P31 | 13 |
| P4 | 14 | P4 | 14 |

FIG. 9

| DATA BYTE NUMBER | SEQUENCE NUMBER AT B' | SEQUENCE NUMBER AT B |
|---|---|---|
| SYN | 11 | 101 |
| DB1 | 12 | 102 |
| ⋮ | ⋮ | ⋮ |
| DB51 | 62 | 62 (EXPECTED 152) |

(PRIOR ART)
FIG. 12

| DATA BYTE NUMBER | SEQUENCE NUMBER AT B' | SEQUENCE NUMBER AT B |
|---|---|---|
| SYN | 11 | 11 |
| DB1 | 12 | 12 |
| ⋮ | ⋮ | ⋮ |
| DB51 | 62 | 62 (EXPECTED 62) |

FIG. 13

| DATA BYTE NUMBER | SEQUENCE NUMBER AT B' | SEQUENCE NUMBER AT B |
|---|---|---|
| SYN | 11 | 11 |
| DB1 | 12 | 12 |
| ⋮ | ⋮ | ⋮ |
| DB10 | 21 | 21 |
| | | 22 |
| | | ⋮ |
| | | 51 |
| DB11 | 22 | 52 |
| DB12 | 23 | 53 |
| ⋮ | ⋮ | ⋮ |
| DB111 | 122 | 152 |

30 BYTES ADDED BY ANALYZER

FIG. 14

ONE-WAY PROXY SYSTEM

BACKGROUND OF THE INVENTION

This invention relates to proxy systems, and more particularly, to one-way proxy systems that allow an analyzer application to perform operations on data traffic flowing in one direction between transport control protocol endpoints in a network.

Transport control protocol (TCP) is a protocol used to support data communications. TCP supports two unidirectional data traffic streams. A TCP session involves transmission and reception of data traffic between two respective TCP endpoints. At each TCP endpoint an application is run on top of the TCP session. These applications provide TCP data to be sent and consume TCP data that is received. As an example, there may be an internet browser application at a TCP endpoint that communicates with a web server application at another TCP endpoint.

The TCP protocol is a reliable connection-oriented transport protocol that supports features such as in-order delivery of bytes and flow control. Each TCP endpoint in a session provides these properties.

Sometimes there is a need to insert software such as a stateful firewall, a content filtering package, or a virus scanner in a TCP stream. For example, an organization may desire to scan traffic for computer viruses. Traditionally, a proxy server solution is used in these situations. A network element is placed in the path of the TCP session (e.g., at the edge of the organization's network). The network element is used to implement a proxy server system that has two proxy points. The virus scanner or other software is run as an application between the two proxy points.

Conventional proxy server arrangements such as these break the original TCP session into two independent TCP sessions. A first TCP session runs between the first original TCP endpoint and the first proxy point. A second TCP session runs between the second proxy point and the second original TCP endpoint. With this architecture, complete TCP processing is required for each of the two TCP sessions, even when it is only desired to process traffic in one direction.

The need to perform complete TCP processing for both TCP sessions adversely affects the performance of the network element, as reflected in performance metrics such as overall throughput and the number of sessions that can be created per unit time. Conventional proxy server arrangements are also not able to provide fail close support. When a conventional network element switches into hardware bypass mode upon detecting a failure, the existing TCP sessions cannot survive.

It is therefore an object of the present invention to provide a one-way proxy architecture that processes TCP traffic between TCP endpoints more efficiently and reliably than conventional two-way proxy server architectures.

SUMMARY OF THE INVENTION

A one-way proxy system is provided that supports one-way analysis of a transport control protocol (TCP) data stream. The one-way proxy system is used to intercept a TCP data stream between two respective TCP endpoints. An analyzer such as a one-way content filter, virus scanner, or firewall may be used to analyze data that is flowing in one direction in the intercepted TCP data stream.

The one-way proxy system can be implemented on a network appliance with or without a hardware bypass switch. If the system is implemented with a hardware bypass switch and a failure is detected, the hardware bypass switch is activated to divert data traffic through a bypass path. In the transition to bypass mode, the existing TCP session survives, providing reliable operation.

The one-way proxy system propagates TCP options and TCP properties through the network appliance unchanged. For example, the time stamp values associated with incoming TCP packets are used on the outgoing packets, so that the TCP session between the TCP endpoints will survive, even if the network appliance enters hardware bypass mode. The analyzer may add, delete, and modify packets. These data stream modifications are accommodated by modifying the TCP headers of packets flowing through the one-way proxy system. TCP header information that may be modified includes acknowledgements (ACKs), selective acknowledgements (SACKs), window size parameters, and checksum values. The window size parameter may be controlled to automatically create backpressure to relieve congestion when an outgoing data queue becomes too full.

Because the one-way proxy does not need to support two independent TCP sessions to intercept data flowing between the TCP endpoints, the one-way proxy has low overhead relative to conventional two-way proxy architectures. Moreover, because the one-way proxy system allows TCP sessions to survive even in the event of a hardware bypass, the one-way proxy system is more reliable than two-way proxy architectures.

Further features of the invention, its nature and various advantages will be more apparent from the accompanying drawings and the following detailed description of the preferred embodiments.

BRIEF DESCRIPTION OF THE DRAWINGS

FIG. 5 is a table showing how conventional two-way proxy systems operate when data traffic is interrupted by a hardware bypass event.

FIG. 6 is a table showing how a one-way proxy system operates when data traffic is interrupted by a hardware bypass event in accordance with the present invention.

FIG. 7 is a table showing how the one-way proxy system may provide outgoing data packets that have been processed together with the same time stamp value in accordance with the present invention.

FIG. 8 is a table showing how conventional two-way proxy systems handle time stamps when inserting packets in an intercepted TCP data stream.

FIG. 9 is a table showing how a one-way proxy system can use time stamp values for outgoing packets that are equal to the most recent time stamp values of corresponding incoming packets to allow for data insertion in an intercepted TCP data stream in accordance with the present invention.

FIG. 12 is a table showing how conventional two-way proxy systems operate when data traffic is interrupted by a hardware bypass.

FIG. 13 is a table showing how a one-way proxy system in which sequence numbers are generated based on a retained initial sequence number value allows a TCP session to survive when the system enters hardware bypass mode in accordance with the present invention.

FIG. 14 is a table showing how the one-way proxy system handles sequence numbers in a scenario in which the analyzer adds data to the data stream in accordance with the present invention.

DETAILED DESCRIPTION OF THE DRAWINGS

The present invention relates to methods and apparatus for enhancing performance and reliability when processing transport control protocol (TCP) traffic. TCP is a well known communications protocol. In a typical scenario, a client application (e.g., a user's web browsing client) communicates with a server application (e.g., a web server) over a network.

Figure 1:
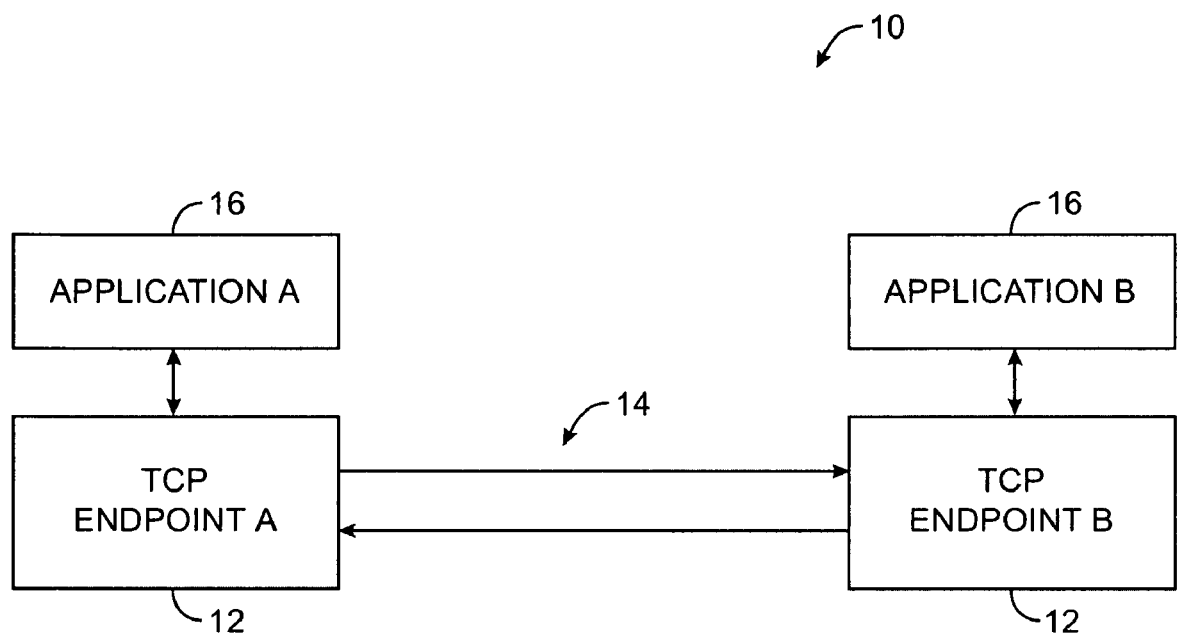
FIG. 1 is a diagram showing a conventional transport control protocol (TCP) link between two TCP endpoints.

The network elements at either end of a TCP session are called TCP endpoints. A typical arrangement is shown in FIG. 1. The illustrative system 10 of FIG. 1, includes two TCP endpoints 12 that communicate over a communications path 14. Communications path 14 may be a network path such as an internet path.

Applications 16 interface with respective TCP endpoints and create and consume data. As an example, application A may create data to be transmitted to application B. The data is passed to TCP endpoint A, which transmits the data to TCP endpoint B over communications path 14 using TCP. At TCP endpoint B, the transmitted data is received and passed to application B, which uses the received data. Application B can transmit data to application A using the same arrangement in reverse.

In the following discussion, the two network nodes between which data is exchanged are referred to as TCP endpoint A and TCP endpoint B. In general, these TCP endpoints may be implemented using any suitable hardware and/or software scheme. For example, TCP endpoints may be implemented using personal computers, handheld computing devices, mainframe computers, computer clusters, etc.

Sometimes it is desirable to intercept and process TCP traffic flowing between two TCP endpoints. For example, an organization may want to intercept incoming data traffic to scan for viruses. Organizations may also want to perform content filtering or firewall operations on the traffic entering or leaving the organization's computer system.

These processing functions can be performed by using an appropriately-located network appliance to intercept network traffic. A network appliance is a type of network element (e.g., a computer) that has been optimized to handle communications functions. A typical network appliance may have a hardware bypass switch, high-speed communications ports, and processing circuitry including memory and storage circuitry. The processing circuitry is used to implement an analyzer application. The analyzer may be a firewall, content filter, virus scanner, etc.

Figure 2:
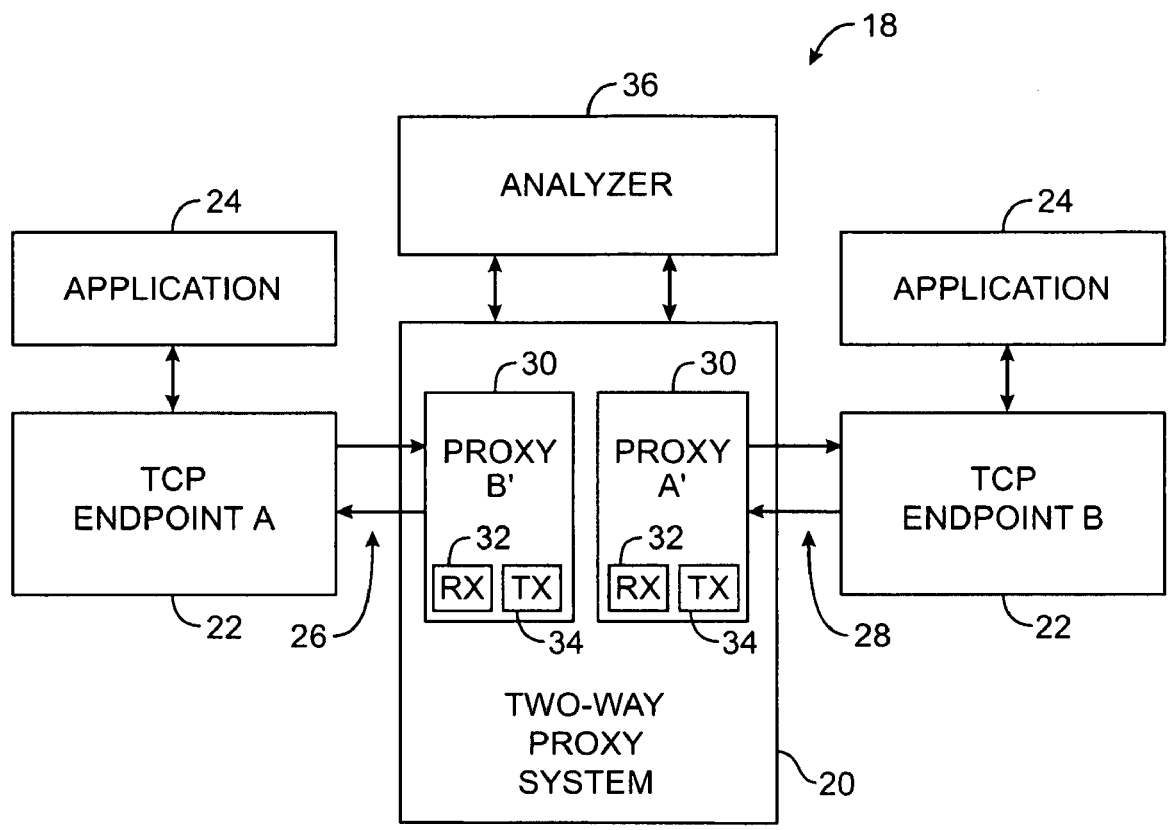
FIG. 2 is a diagram of a conventional two-way proxy system that is being used to intercept a TCP data stream flowing between two TCP endpoints.

In conventional arrangements, the network appliance is configured to function as a two-way proxy server. An illustrative system environment in which a conventional two-way proxy server is used is shown in FIG. 2. As shown in the example of FIG. 2, network appliance 20 has been inserted in the communications path between TCP endpoints 22 and their respective applications 24, creating two communications paths 26 and 28. Path 26 is used to support communications between TCP endpoint A and network appliance 20. Path 28 is used to support communications between network appliance 20 and TCP endpoint B.

The network appliance 20 is used to implement two proxy points 30. The proxy points 30 intercept the traffic flowing in both directions between TCP endpoint A and B and provide this traffic to analyzer 36 for processing.

Each proxy point 30 has its own receiver 32 and transmitter 34. The proxy point adjacent to TCP endpoint A in FIG. 2 handles communications with TCP endpoint A and is referred to as proxy B'. The proxy point adjacent to TCP endpoint B in FIG. 2 handles communications with TCP endpoint B and is referred to as proxy A'. As these labels indicate, proxy B' serves as a surrogate TCP endpoint similar to TCP endpoint B when interacting with TCP endpoint A, whereas proxy A' performs functions similar to those of TCP endpoint A when communicating with TCP endpoint B.

Data that is transmitted from A to B over path 26 is received by the receiver 32 of proxy B' and is passed to analyzer 36 for processing. Following processing, the data is passed to proxy A', which uses its transmitter 34 to transmit the processed data to TCP endpoint B over path 28. Similarly, data that is transmitted from B to A over path 28 is received by proxy A' using its receiver 32. A' passes the received data to analyzer 36. Analyzer 36 processes the received data and passes the processed data to proxy B'. Proxy B' uses its transmitter 34 to transmit the processed data to TCP endpoint A over path 26.

The conventional two-way proxy arrangement of FIG. 2 allows analyzer 36 to process TCP traffic flowing in both directions between TCP endpoint A and TCP endpoint B. However, this type of approach requires complete TCP processing by each of the proxy points 30 and results in two independent TCP sessions. One TCP session is used to support communications between TCP endpoint A and proxy B'. At the same time, a separate TCP session is used to support communications between proxy A' and TCP endpoint B.

The conventional two-way proxy architecture of FIG. 2 may be satisfactory in some circumstances, but its performance is hindered by the need to administer two complete TCP sessions even when it is only desired to analyze traffic in one direction. The conventional two-way proxy architecture is also not capable of retaining a TCP session between endpoints A and B in the event of a hardware bypass event, which tends to reduce the reliability of systems implemented using the two-way architecture.

Figure 3:
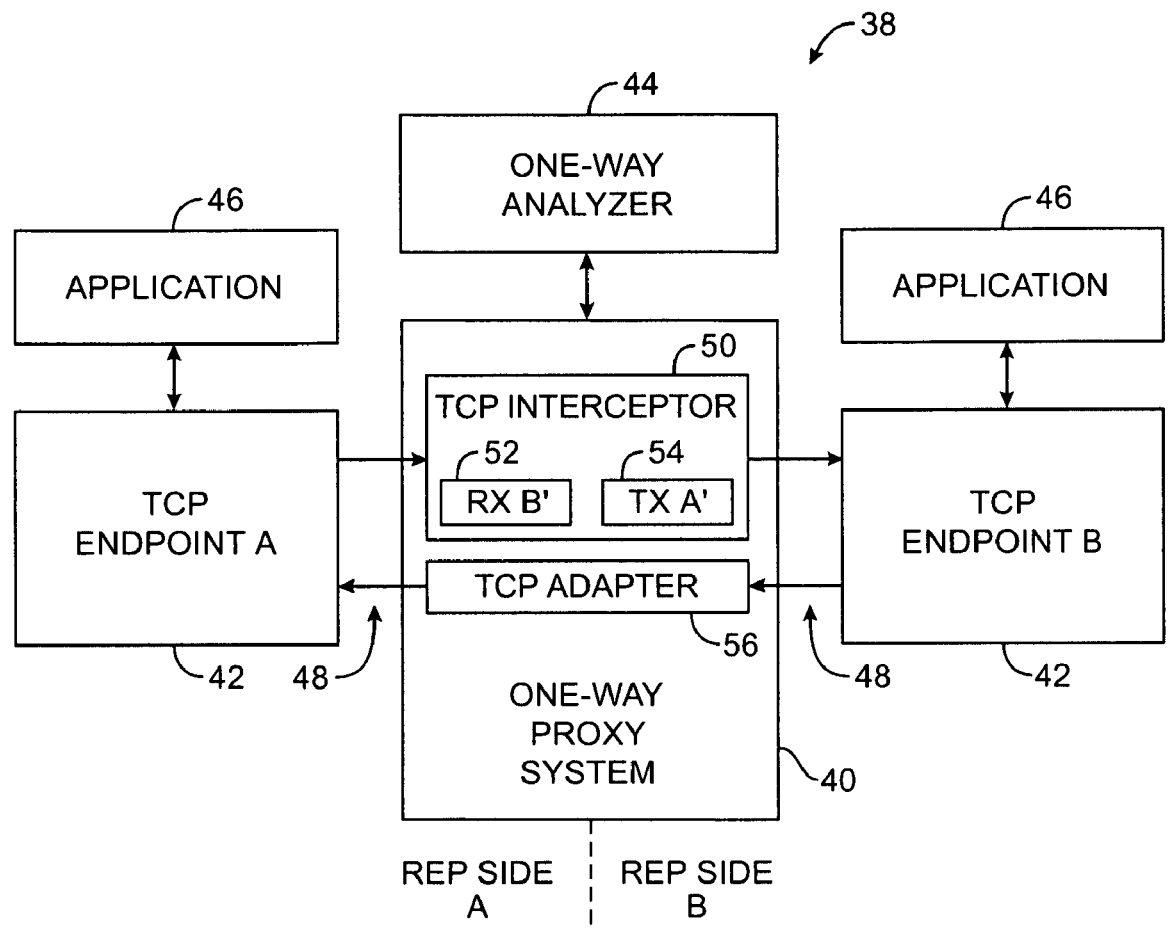
FIG. 3 is a diagram of a one-way proxy system implemented on an inline network appliance that is intercepting a single session of TCP data flowing between two TCP endpoints in accordance with the present invention.

The present invention uses a one-way proxy architecture to provide efficient and reliable interception and processing of TCP traffic. A system 38 in accordance with the present invention is shown in FIG. 3. System 38 has an inline network appliance 40 that is used to implement a one-way proxy system that intercepts TCP traffic flowing between TCP endpoints 42. The network appliance 40 is said to be an "inline" appliance because all data traffic flowing between TCP endpoints 42 passes through the appliance. During operation, the network appliance and other components of system 38 run software which configures the system so that the system performs the methods of the present invention.

The side of the one-way proxy system that is adjacent to TCP endpoint A in FIG. 3 is sometimes referred to as "rep side A" and handles communications with TCP endpoint A. Rep side A refers to receiver B' in the context of TCP interceptor 50 and includes the portion of the TCP adapter 56 that is transmitting to TCP endpoint A. The side of the one-way proxy system that is adjacent to TCP endpoint B in FIG. 3 is sometimes referred to as "rep side B" and handles communications with TCP endpoint B. In the context of the TCP interceptor 50 rep side B refers to transmitter A' and includes the portion of the adapter transmitting to B.

Analyzer 44 is used to process the intercepted traffic. Analyzer 44 may be a firewall package, a content filter, a virus scanner, a network patching program that patches network traffic to fix security vulnerabilities, or any other suitable processing software and/or hardware arrangement that is used to process the intercepted TCP traffic. Analyzer 44 only processes the TCP traffic flowing in one direction over communications path 48. In the following discussion, the TCP traffic that is processed by analyzer 44 is the traffic flowing from TCP endpoint A to TCP endpoint B. The TCP traffic flowing from TCP endpoint B to TCP endpoint A (in this example) is not processed by analyzer 44. Because analyzer 44 only processes TCP traffic flowing in one direction, analyzer 44 is sometimes referred to as a one-way analyzer.

Each TCP endpoint 42 interfaces with local applications 46. Applications 46 may be any suitable software applications (e.g., email software, web browsing software, etc.). An application that desires to send data passes the data to be sent to its associated TCP endpoint 42. The TCP endpoint accepts the data and, using TCP, transmits the data to the other TCP endpoint 42. Depending on the direction of data flow, system 40 either intercepts and processes the data using analyzer 44 or passes the transmitted data through without analyzer processing. At the receiving TCP endpoint, the transmitted data is received and provided to the associated application 46.

The one-way proxy system 40 has a TCP interceptor 50 that intercepts TCP traffic flowing from TCP endpoint A to TCP endpoint B. TCP interceptor 50 uses receiver 52 and transmitter 54 to receive and send data. The receiver 52 is labeled B' in FIG. 3, because receiver 52 performs all TCP receive functions on communications transmitted from TCP endpoint A, as would a TCP endpoint such as endpoint B in FIG. 1. Similarly, the transmitter 54 is labeled A' in FIG. 3 because transmitter 54 serves as a TCP transmitter for communications destined to TCP endpoint B, just as TCP endpoint A of FIG. 1 serves as a TCP transmitter.

TCP traffic flowing from TCP endpoint B to TCP endpoint A is handled by TCP adapter 56. Relatively minimal processing is performed on the TCP traffic flowing through the TCP adapter 56 relative to what would be performed with proxies A' and B' of FIG. 2, which helps to reduce overhead.

Moreover, unlike the two-way proxy system of FIG. 2, the one-way proxy system of FIG. 3 maintains a single end-to-end TCP session between TCP endpoints A and B. The two-way proxy system of FIG. 2 maintains two independent TCP sessions—one between A and B' and one between A' and B. In the one-way proxy system of FIG. 3, it is only necessary to operate a single TCP receiver B' for receiving/reading TCP traffic from endpoint A and a single TCP transmitter A' for writing/transmitting traffic to TCP endpoint B, whereas in the conventional system of FIG. 2, analyzer 36 must handle complex session management tasks associated with operating four interfaces (two receivers 32 and two transmitters 34).

In performing its receiver functions for TCP interceptor 50, receiver 52 functions as a TCP receiver and handles all tasks normally associated with a TCP receiver such as TCP header validation, reordering of out-of-order packets, acknowledging data received, creating selective acknowledgements if needed, and creating duplicate acknowledgement numbers if needed.

In performing its transmitter functions for TCP interceptor 50, transmitter 54 serves as a TCP transmitter and handles all tasks normally associated with a TCP transmitter such as TCP header creation, queuing TCP packets for possible retransmissions, and congestion control.

The TCP adapter 56 receives data from TCP endpoint B and, following modification to TCP packet headers in the data, transmits this data to TCP endpoint A.

Figure 4:
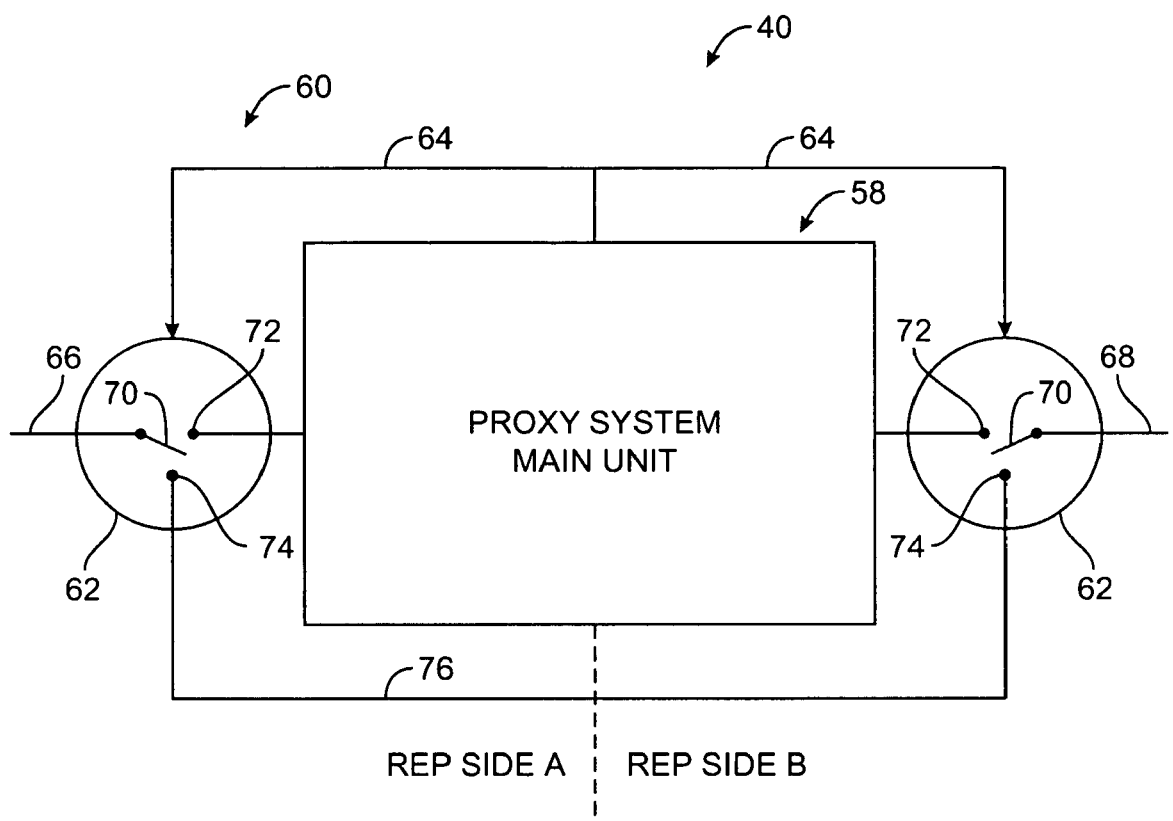
FIG. 4 is a diagram showing how a proxy system may use a hardware bypass switch in accordance with the present invention.

Network appliance 40 may be provided with hardware bypass capabilities. An illustrative network appliance 40 with a hardware bypass circuit 60 is shown in FIG. 4. As shown in FIG. 4, circuit 60 has two bypass switches 62. Switches 62 are controlled by proxy system main unit 58 through control signal paths 64. Path 66 communicates with TCP endpoint A over the portion of path 48 shown on the left-hand side of FIG. 3. Path 68 communicates with TCP endpoint B over the portion of path 48 shown on the right-hand side of FIG. 3.

As shown in FIG. 4, each switch 62 can be controlled by control signals on a respective path 64 so that its switch element 70 is connected to its terminal 72 or to its terminal 74. When the system is operating properly, elements 70 are connected to terminals 72 and data traffic flows through the proxy system main unit 58. In the event of a system failure (e.g., because the normal software operations of main unit 58 are momentarily interrupted), the main unit 58 can place the appliance 40 in hardware bypass mode. In this mode, the switch elements 70 are connected to terminals 74 and signals flow past main unit 58 through bypass path 76.

In conventional two-way proxy architectures, when a network appliance is switched into hardware bypass mode, existing TCP sessions are lost. It is not possible to merge an A/B' TCP session with an A'/B TCP session.

With the one-way proxy architecture of FIG. 3, the TCP interceptor 50 and the TCP adapter 56 process the TCP packets flowing between endpoints A and B in a way that allows the TCP session between endpoints A and B to be maintained in the event that network appliance 40 automatically detects a system failure and switches into hardware bypass mode.

TCP packets contain time stamps. When two independent TCP sessions are running as in the conventional two-way proxy architecture of FIG. 2, the time stamps on the TCP packets flowing between TCP endpoint A and proxy B' are completely independent from the time stamps of the TCP packets flowing between proxy A' and TCP endpoint B. This situation is illustrated in the table of FIG. 5.

In the example of FIG. 5, five TCP packets (labeled P1-P5) are being transmitted from endpoint A to endpoint B in the conventional two-way proxy system of FIG. 2. Following TCP procedures, the TCP endpoint A time stamps each packet with a time stamp before that packet is transmitted to proxy B'. The time stamps that are given to the TCP packets by TCP endpoint A and that are received at proxy B' are shown in the second column of the table of FIG. 5. During normal operation of the two-way proxy system 20 (i.e., when system 20 is not in hardware bypass mode), proxy A' creates its own time stamps for packets P1-P5 (following processing of the packets by analyzer 36) because the A'/B TCP session is independent from the A/B' TCP session.

The time stamps of the TCP packets P1-P5 as provided by proxy A' and received at TCP endpoint B are shown in the third column of the table of FIG. 5. Dotted line 78 represents a system failure. The time stamp values in the portion of the table above dotted line 78 are associated with the packets P1-P4 before the system is switched into hardware bypass mode. The time stamps in the portion of the table below dotted line 78 represent the time stamps associated with packet P5 after the system has switched into hardware bypass mode.

In the example of FIG. 5, TCP endpoint A labeled the packets P1, P2, P3, P4, and P5 with respective sequential time stamps 11, 12, 13, 14, and 15. These time stamps were received at proxy B', as indicated by the second column of the table of FIG. 5. Before the hardware bypass occurred, the proxy A' independently generated new time stamps. As shown in the third column of the table of FIG. 5, the packets P1, P2, P3, and P4 are provided with respective sequential time stamps of 101, 102, 103, and 104 by proxy A' (in this example). When the hardware bypass occurs at the time indicated by line 78, the TCP traffic originating at TCP endpoint A is directed through a path that bypasses both proxy B' and proxy A'.

Because proxy A' has been bypassed, proxy A' is no longer able to create new time stamps for the packets. As a result, the time stamp for packet P5 that was created for packet P5 at TCP endpoint A is passed to TCP endpoint B unchanged. This will lead to loss of the TCP session(s) between TCP endpoints A and B, because the packets will appear to be out of order to TCP endpoint B. In the example of FIG. 5, the time stamp value that TCP endpoint A attaches to packet P5 is 15. This time stamp value bears no relation to the time stamp value of 104 for the previous packet received at TCP endpoint B (i.e., packet P4). TCP endpoint B performs a prevention against wrapped sequence (PAWS) check to determine whether received packets are in order. When TCP endpoint B receives a packet with a time stamp of 15 following receipt of a packet with a time stamp of 104, the PAWS check will fail and the TCP session will be terminated.

As shown by the table of FIG. 6, the one-way proxy system of FIG. 3 creates a virtual time stamp that ensures that the existing TCP session will not fail, even in the event of a hardware bypass. With the system of FIG. 3, TCP interceptor 50 places time stamps on outgoing packets using the most recently received time stamp value from the incoming stream. If packets are inserted by one-way analyzer 44, multiple packets are transmitted with the same time stamp value. If no packets are inserted, the time stamp values for the packets transmitted by transmitter A' of TCP interceptor 50 are unchanged from the time stamp values for the packets transmitted by TCP endpoint A, as shown in the table of FIG. 6.

In the example of FIG. 6, one-way proxy system 40 operates normally (not in bypass mode) for packets P1-P4. At the time represented by dotted line 78, one-way proxy system 40 detects a system problem that causes one-way proxy system to use its switch 60 (FIG. 4) to bypass the TCP interceptor 50 and the TCP adapter 56. Because the time stamp values attached to the packets such as P1-P4 that are transmitted by transmitter A' are the same as those originally attached by TCP endpoint A, the packets received at TCP endpoint B after the hardware bypass event such as packet P5 will have time stamp values that are in the proper sequence relative to the most recently received packets from transmitter A' (e.g., packet P4).

As shown in FIG. 6, the TCP endpoint B receives packet P5 having a time stamp value of 15 from TCP endpoint A through the bypass path after receiving packet P4 with a time stamp value of 14 from TCP interceptor 50. Because 15 is greater than 14, the PAWS check performed by TCP endpoint B will not fail and the TCP session between TCP endpoints A and B will be preserved, even though the system entered the hardware bypass mode and began directing packets such as packet P5 past the TCP interceptor 50 and directly from TCP endpoint A to TCP endpoint B at time 78.

In some circumstances, the TCP interceptor 50 holds and processes multiple packets together. In this case, all packets are sent from the TCP interceptor 50 to TCP endpoint B with an identical time stamp value. The time stamp that is used has a time stamp value equal to the most recently received time stamp from TCP endpoint A. This type of behavior is illustrated in FIG. 7. As shown in the table of FIG. 7, TCP endpoint A may issue successive packets P1, P2, P3, and P4, with respective time stamps 11, 12, 13, and 14 and may transmit these packets to TCP interceptor 50. TCP interceptor 50 uses receiver B' to receive the transmitted packets. The time stamp values received at receiver B' are shown in the second column of the table of FIG. 7.

In the example of FIG. 7, the packets P2 and P3 were processed together by TCP interceptor 50. Accordingly, TCP interceptor 50 assigns packets P2 and P3 the most recent time stamp value received from TCP endpoint A (13 in this example), before sending packets P2 and P3 to TCP endpoint B. The result of these time stamp operations are shown in the last column of the table of FIG. 7. Although the time stamp in the last column of the table of FIG. 7 do not continually increment, none of the packets received at TCP endpoint B has a time stamp value that is less than that of the preceding packet. As a result, the PAWS check performed at TCP endpoint B will not fail and the TCP session between TCP endpoint A and B will be preserved.

Both the TCP adapter 56 and the TCP interceptor 50 perform the virtual time stamp function described in connection with FIGS. 5 and 6, so TCP traffic in both directions between TCP endpoints A and B is not disturbed in the event of a hardware bypass. The time stamp holding function described in connection with FIG. 7 need not be used by the TCP adapter 56.

Sometimes it is necessary to insert packets into the TCP data stream flowing from A to B through the analyzer. For example, a virus scanner may desire to place a wrapper around a suspected virus. The wrapper contains additional data and requires the insertion of additional packets not present in the original data being transmitted from TCP endpoint A to TCP endpoint B.

In a conventional two-way proxy system of the type shown in FIG. 2, proxy A' is able to create intermediate time stamp values to accommodate packet insertion. For example, consider the situation in which analyzer 36 of FIG. 2 desires to insert a packet P31 between packet P3 and packet P4, as shown in the table of FIG. 8. TCP endpoint A transmits packets P1, P2, P3, and P4 with respective successive time stamp values of 11, 12, 13, and 14. Proxy B' receives these packets and provides the data in the received packets to analyzer 36 for processing. Following processing, these packets and the additional inserted packet P31 are transmitted from proxy A' to TCP endpoint B.

Proxy A' uses time stamps that bear no relation to the time stamps used by TCP endpoint A. As shown in the table of FIG. 8, for example, the time stamps for P1, P2, P3, and P4 may be 101, 102, 103, and 104, respectively. Because proxy A' is responsible for generating the time stamps for all packets transmitted to TCP endpoint B, proxy A' can generate an appropriate time stamp value for inserted packet P31. For example, proxy A' can select a value for P31's time stamp that lies between the timestamp for P3 and P4. In the example of FIG. 8, the proxy A' has selected the intermediate timestamp value of 103.5 for packet P31. Because this value is greater than 103 and less than 104, the time stamps received at TCP endpoint B will be in order and the PAWS check performed at TCP endpoint B will not fail.

With the one-way proxy arrangement of FIG. 4, the TCP interceptor 50 does not have prior knowledge of which time stamp value will be associated with the next incoming packet from TCP endpoint A. The timestamp values of the examples are successive integers, but in practice the time stamp values need not be so evenly assigned. Because TCP interceptor 50 is not provided with advanced knowledge of the time stamp information from TCP endpoint A, TCP interceptor 50 does not attempt to create intermediate time stamp values of the type described in connection with FIG. 8. Rather, TCP interceptor 50 assigns time stamp values to inserted packets using the value of the most recently received packet from TCP endpoint A.

This approach is shown in the table of FIG. 9. In the example of FIG. 9, the incoming packets P1, P2, P2, and P4 have respective time stamps of 11, 12, 13, and 14 that were assigned by TCP endpoint A. The TCP interceptor 50 provides these packets to analyzer 44 for processing. Analyzer 44 (in this example) decides to insert a new packet P31 between packets P3 and P4. TCP interceptor 50 receives the packets P1, P2, P3, P31, and P4 from analyzer 44 and assigns these packets new time stamp values. As shown in FIG. 9, interceptor 50 assigns packets P1, P2, P3, and P4 the same time stamp values these packets had when received by receiver B'. Inserted packet P31 is assigned the most recently received time stamp value (13 in this example) before transmission to TCP endpoint B. When the packets are received at endpoint B, the time stamps satisfy the PAWS check, as shown in the last column of the table of FIG. 9.

Figure 10:
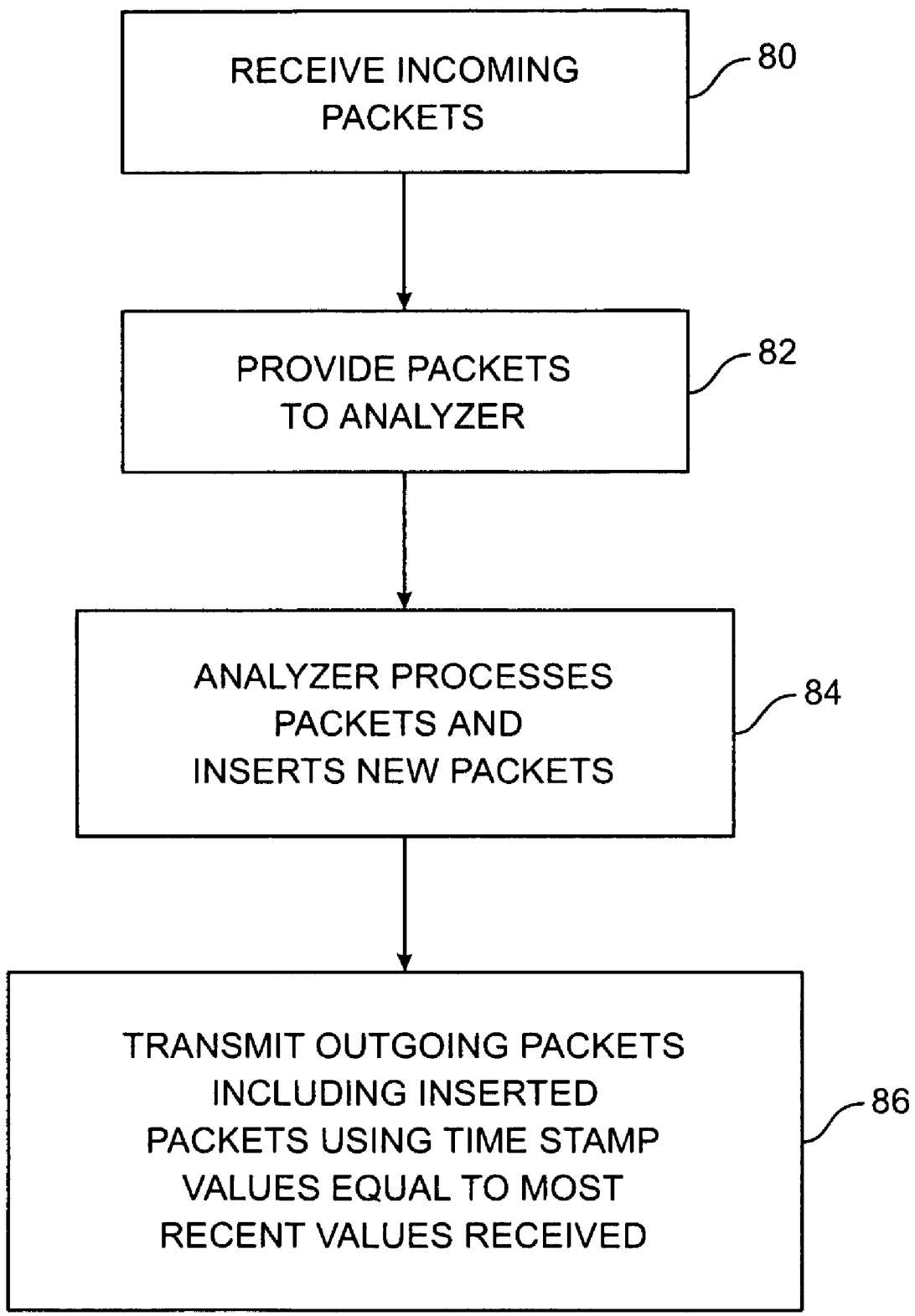
FIG. 10 is a flow chart of illustrative steps involved in adjusting time stamp values in a one-way proxy system to accommodate packet insertion operations in accordance with the present invention.

Illustrative steps involved in processing TCP packets using the one-way proxy system of FIG. 3 are shown in FIG. 10.

At step 80, the one-way proxy system 40 receives incoming packets transmitted from a TCP endpoint.

At step 82, packets flowing in the direction from TCP endpoint A to TCP endpoint B are provided to one-way analyzer 44 for processing.

At step 84, the analyzer 44 (if used) processes the packets and inserts new packets (if desired) or modifies the received packets (if desired).

At step 86, the one-way proxy system transmits the packets to the appropriate TCP endpoint. In transmitting the packets, the one-way proxy system assigns the outgoing TCP packets time stamp values that are equal to the most recently received time stamp values of the incoming TCP packets, as described in connection with FIGS. 5-9.

The way in which sequence numbers are treated by the one-way proxy system, in conjunction with the time stamp behavior described above, allows the existing TCP session between TCP endpoints A and B to survive in the event of a hardware bypass.

Figure 11:
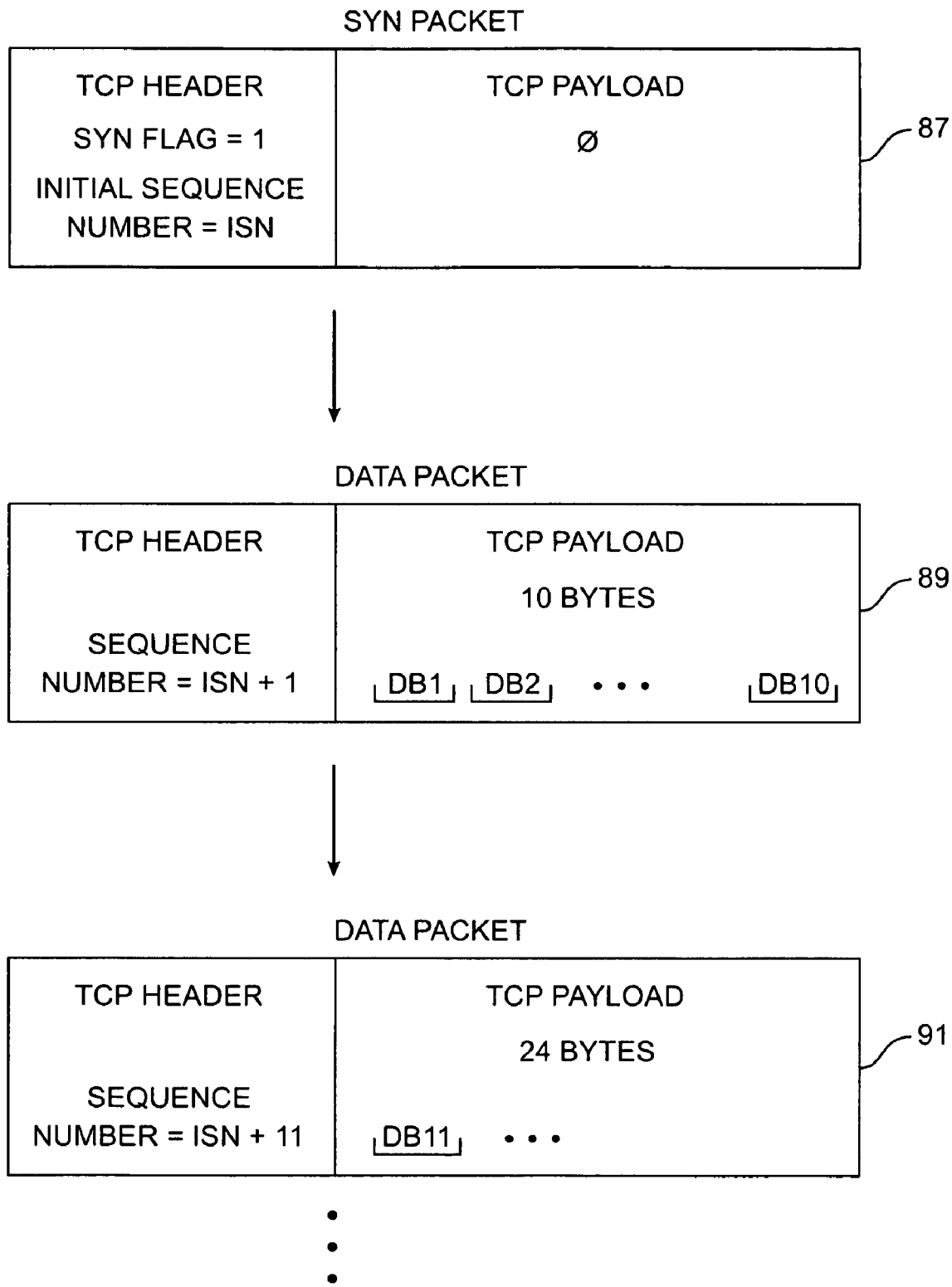
FIG. 11 is a diagram showing how TCP sequence numbers evolve during a TCP session in accordance with the present invention.

In a typical TCP scenario, TCP data packet transmissions start with a SYN packet 87, as shown in FIG. 11. The TCP packet 87 is identified as a SYN packet by setting a SYN flag appropriately in the TCP header of the packet. The sequence number of the SYN packet is set to an initial sequence number value (called ISN in this example). There is no TCP payload associated with the SYN packet.

Following the SYN packet, a series of TCP data packets are transmitted. The TCP data packets each contain a TCP header and a TCP payload portion. The TCP header of each packet contains the sequence number for that packet. The TCP payload portion is used to carry data. During TCP data packet transmission operations, the value of the sequence number is incremented in accordance with the sizes of the payloads being transmitted. Each data byte ("DB") in the TCP payload is reflected by incrementing the sequence number by one. In the example of FIG. 11, data packet 89 contains 10 data bytes (labeled DB1, DB2, . . . DB10) and data packet 91 contains 24 data bytes (labeled DB11, . . . ).

As shown in FIG. 11, the sequence number in the TCP header of data packet 89 is set to ISN+1, because there are no data bytes in the TCP payload portion of SYN packet 87. There are 10 data bytes in the illustrative packet 89, so the sequence number in the TCP header of data packet 91 is incremented by 10 relative to the sequence number in packet 89 (i.e., the sequence number in the header of data packet 91 is ISN+11).

The table of FIG. 12 shows how conventional two-way proxy systems handle sequence numbers. As shown in the first row of table of FIG. 12, the SYN packet received at B' has an associated sequence number (11 in this example) that is unrelated to the sequence number that the two-way proxy system uses for sending packets to B (101 in this example). Following TCP procedures, endpoint A and proxy A' each increment the sequence number in accordance with the approach described in connection with FIG. 11. The numbers in the second column of FIG. 12 indicate how the sequence number increments from 11 to 12 and so one until eventually reaching 62 (in this example). At the point in time represented by line 93, a failure is detected that forces the two-way proxy system into hardware bypass mode. TCP endpoint A is unaffected, so TCP endpoint A generates sequence number 62 as expected. Due to the hardware bypass, proxy A' is unable to continue generating sequence numbers for the data being transmitted to TCP endpoint B by the two-way proxy system. Accordingly, even though proxy A' has been generating sequence numbers 101, 102, . . . , following the hardware bypass event 93, proxy A' ceases generating sequence numbers. The sequence numbers in the packets that pass through the bypass switch and are received at TCP endpoint B after the bypass event 93 takes place have the sequence numbers that were assigned by TCP endpoint A. In the example of FIG. 12, this results in a TCP packet with a sequence number of 62 (created by TCP endpoint A) being received at TCP endpoint B. Because TCP endpoint B was expecting to receive a TCP packet with a sequence number of 152 at this time, TCP endpoint B will not be able to properly handle the received data and the TCP session will not survive.

The operation of the one-way proxy system of the present invention under similar circumstances is shown in the table of FIG. 13. The first column of the table of FIG. 13 shows what is being transmitted from TCP endpoint A (i.e., a SYN packet or a data byte in a TCP data packet). The second column of the table of FIG. 13 indicates the associated sequence number that has been assigned by the transmitting TCP endpoint A and that is received at B'. The third column shows the sequence numbers received at TCP endpoint B. Because the sequence numbers from A are passed through to TCP endpoint B without modification by the one-way proxy system, the sequence numbers received at B are the same as those sent by A.

In the example of FIG. 13, the one-way proxy system enters hardware bypass mode at the point in time indicated by line 95. The TCP packets at this point are diverted through the bypass switch. Unlike the conventional situation of FIG. 12, however, this diversion of the TCP packets does not affect the existing TCP session. The existing TCP session survives, because, as shown in FIG. 13, the sequence numbers of the packets received at TCP endpoint B after the hardware bypass event are in order as expected. TCP endpoint B is therefore able to continue processing the data received after the hardware bypass event without interruption.

Analyzer 36 can add, delete, and modify data in the stream received from TCP endpoint A, before sending the data to TCP endpoint B. In this situation, the sequence number is incremented by one for each byte of data (DB) as described above. For example, consider a scenario in which 30 bytes of data has been added by analyzer 36 after the first 10 bytes. Assume the value of ISN is 11. Then, as illustrated in the table of FIG. 14, for the first 10 bytes the sequence numbers at B' will be same as that at B (12 . . . 21). At this point analyzer 36 adds 30 bytes of data. The next 30 sequence numbers (22 . . . 51) are used to accommodate the added 30 bytes of data. Accordingly, TCP endpoint B will receive data corresponding to sequence numbers 22 . . . 51, even though this data was never sent by TCP endpoint A. When the following byte is received at B' from TCP endpoint A, its sequence number will be 22. When this byte is sent out to B its sequence number will be 52. If the analyzer does not make any other change to the stream for this TCP session, then every byte that follows will have its sequence number incremented by 30 by the TCP interceptor 50.

Figure 15:
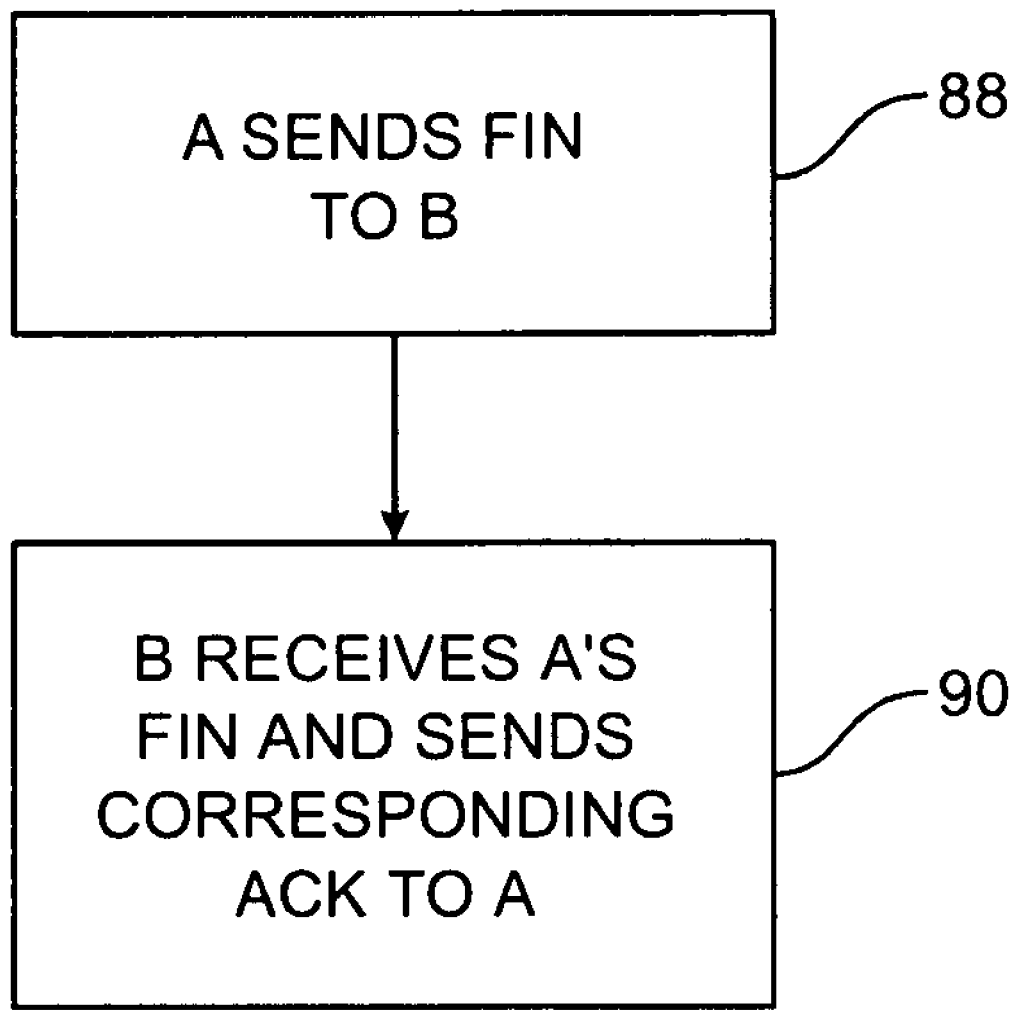
FIG. 15 is a flow chart of a conventional TCP session closing operation.

Operation of a functioning TCP link involves the opening and closing of TCP sessions between the link endpoints. The steps involved in closing a conventional TCP session in a conventional system of the type shown in FIG. 1 are shown in FIG. 15.

At step 88, a TCP endpoint that desires to initiate session closing operations sends a FIN command to the other endpoint. A FIN is represented by a TCP header flag. In the example of FIG. 15, TCP endpoint A starts to close the session by sending a FIN to B.

At step 90, B receives A's FIN. In response, B sends an acknowledgement signal (ACK) to A. This closes the A to B direction of the TCP link. The B to A direction is closed in a symmetrical fashion, thereby completing the process of closing the TCP session between TCP endpoints A and B.

In a conventional two-way proxy system of the type shown in FIG. 2, the TCP session between TCP endpoint A and proxy B' and the TCP session between proxy A' and TCP endpoint B are each closed in a similar fashion. To close the A/B' session, TCP endpoint A sends a FIN to B', which sends an ACK to A and informs the analyzer that an A-B' close request has been received. The analyzer (if desired) can ask B' to send a FIN to A, which A acknowledges by sending an ACK to B'. To close the A'/B session, A' sends a FIN to B, which B acknowledges with an ACK. Endpoint B sends a FIN to proxy A', which A' acknowledges by sending an ACK to endpoint B.

Figure 16:
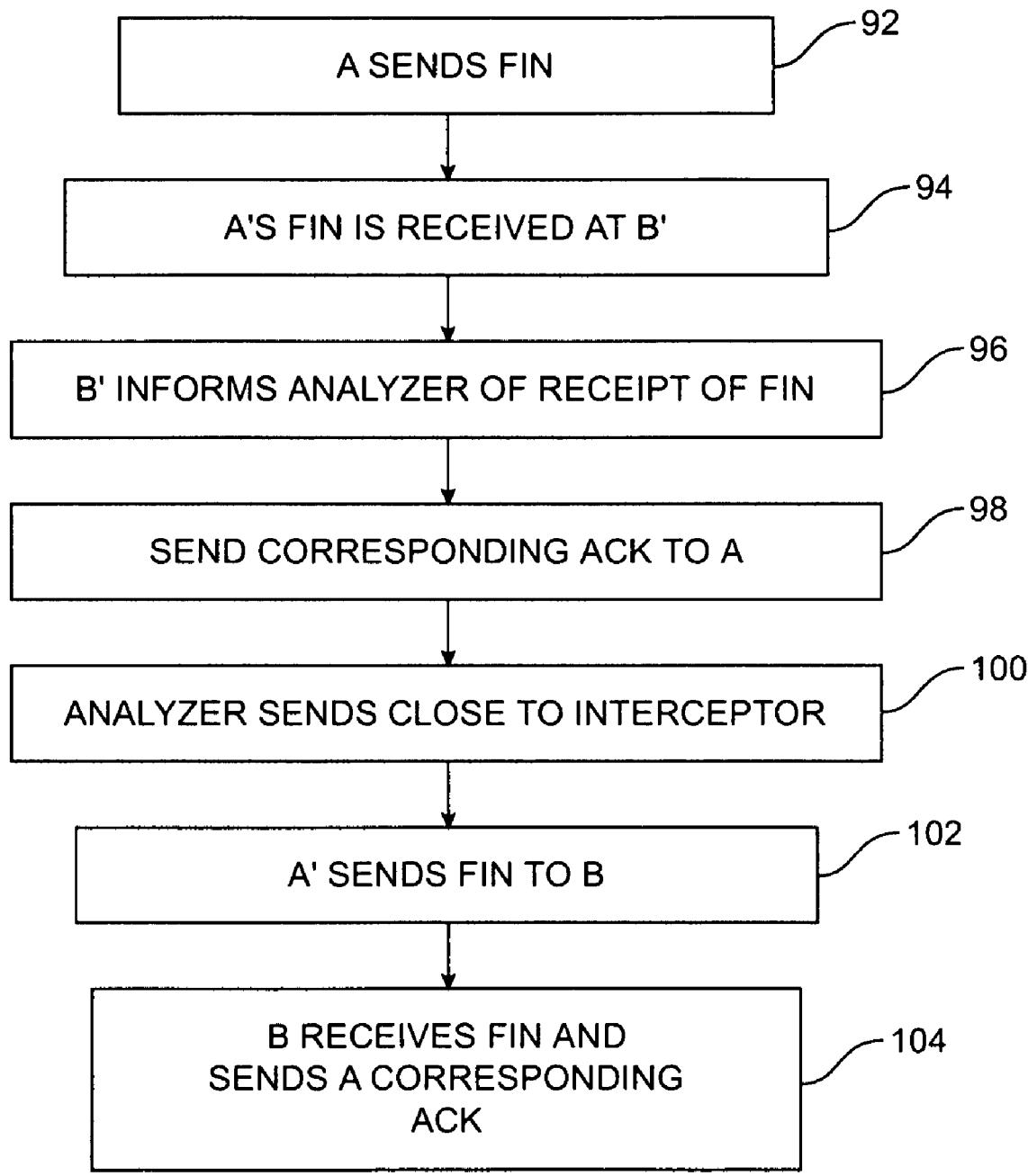
FIG. 16 is a flow chart of illustrative steps involved in closing a TCP session between TCP endpoints when session termination operations are initiated by the TCP endpoint whose transmissions are being intercepted and analyzed by an analyzer associated with a one-way proxy system in accordance with the present invention.

In the one-way proxy system of FIG. 3, the closure procedures involved in closing the A to B direction differ from the closure procedures involved in closing the B to A direction. Illustrative steps involved in closing the A to B direction in system 38 of FIG. 3 are shown in FIG. 16.

At step 92, TCP endpoint A sends a FIN to receiver B' in TCP interceptor 50.

At step 94, the FIN from TCP endpoint A is received at B'. The FIN is not immediately forwarded to TCP endpoint B, because it is not immediately clear whether analyzer 44 is finished processing data.

In response to receiving the FIN at step 94, TCP interceptor 50 informs the one-way analyzer 44 that the FIN has been received (step 96). In addition, the one-way proxy system 40 sends an ACK to TCP endpoint A to acknowledge the receipt of the FIN (step 98).

When the analyzer 44 is finished data processing operations, analyzer 44 sends a CLOSE signal to TCP interceptor 50 by placing a CLOSE call on a TCP stack associated with one-way proxy system 40 (step 100).

In response to the CLOSE, transmitter A' sends a FIN (i.e., A' forwards A's original FIN) to TCP endpoint B (step 102). The FIN is represented by a flag in the TCP header of the transmitted TCP packet.

At step 104, TCP endpoint B receives the FIN and sends a corresponding ACK to the one-way proxy system 40 to acknowledge closing of the A to B direction.

According to TCP, acknowledgements contain sequence numbers that are incremented relative to the sequence numbers of the packets they are acknowledging. Accordingly, acknowledgements carry information related to the packets that are being acknowledged. In the present situation, the ACK received by the one-way proxy from B reflects the stream that has been received at TCP endpoint B from the TCP interceptor 50, so one-way proxy system 40 modifies the ACK received from endpoint B before forwarding it to endpoint A. In this way, the ACK sent to A reflects the properties of the stream that was originally sent to one-way proxy system 40 by TCP endpoint A.

Figure 17:
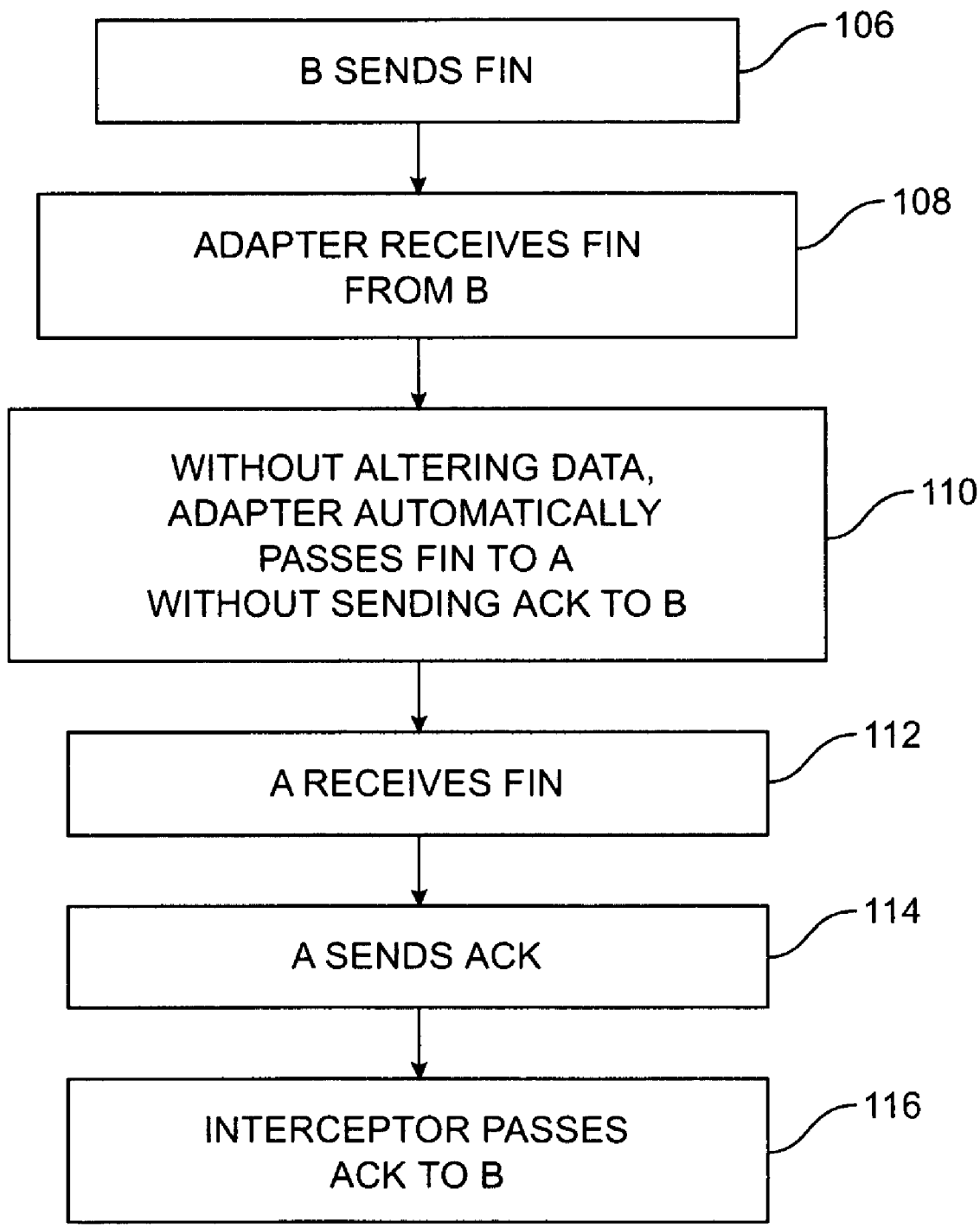
FIG. 17 is a flow chart of illustrative steps involved in closing a TCP session between TCP endpoints when session termination operations are initiated by the TCP endpoint whose transmissions are flowing through a one-way proxy system without being analyzed by an analyzer in accordance with the present invention.

Steps involved in the closure of the B to A direction of the link between TCP endpoint A and TCP endpoint B in the system of FIG. 3 are shown in FIG. 17.

At step 106, TCP endpoint B sends a FIN to one-way proxy system 40.

At step 108, TCP adapter 56 receives the FIN from B.

Because one-way proxy system 40 does not use the analyzer to process the data flowing from TCP endpoint B to TCP endpoint A, whenever the TCP adapter 56 receives a FIN from B, TCP adapter 56 automatically passes the FIN to A (step 110). TCP adapter 56 does not send an ACK to TCP endpoint B in response to receiving the FIN, because this would lead TCP endpoint B to conclude that B's transmission had been successfully received at TCP endpoint A.

Only after TCP endpoint A receives the FIN from B (step 112) and TCP endpoint A responds by sending an ACK to one-way proxy system 40 (step 114), is the ACK passed through to TCP endpoint B (step 116) to acknowledge successful receipt of B's FIN by TCP endpoint A.

As the steps of FIG. 17 make clear, no ACK is generated by one-way proxy system 40 in response to receipt of the FIN by B. Suppressing generation of an ACK in this way prevents false indications of successful closure of the B to A direction. Rather than relying on one-way proxy system 40 to generate the ACK, responsibility for generating the ACK rests with TCP endpoint A. TCP interceptor 50 passes this ACK through to TCP endpoint B unaltered, which allows A to acknowledge B's closure of the B to A direction directly. This behavior applies in general to all of the packets passing from TCP endpoint B to TCP endpoint A. The ACKs for data from TCP endpoint B are not generated by the one-way proxy system. Rather, the ACKs that have been generated by TCP endpoint A in response to data from TCP endpoint B are passed through to TCP endpoint B. In this way, the system only acknowledges data received from TCP endpoint B by passing acknowledgements to TCP endpoint B that have been received from TCP endpoint A.

Because the analyzer 44 modifies data received from TCP endpoint A before that data is transmitted to TCP endpoint B, the TCP packets received at TCP endpoint B contain information generated by one-way proxy system 40, rather than containing only information generated by the original TCP endpoint A. To ensure that the TCP packets that the one-way proxy system 40 passes to endpoint A from endpoint B match the originally transmitted data properly, it is sometimes necessary for one-way proxy system 40 (using TCP adapter 56) to modify the TCP headers of the TCP packets flowing from TCP endpoint B to TCP endpoint A. As discussed in connection with step 104 of FIG. 16, for example, when closing a TCP session between A and B, A sends a FIN to B. The FIN contains TCP packet sequence number information. A proper ACK to this FIN must be based on the FIN's original sequence number, not the sequence number of modified data transmitted by A' to B. The TCP adapter 56 therefore alters the TCP header of the ACK from B, so that when A receives the ACK, the sequence number in the ACK will correspond to the sequence number of the FIN originally send by A. The TCP adapter 56 also preferably modifies other TCP header information such as selective acknowledgement (SACK) information, widow size information, and checksum information.

Figure 18:
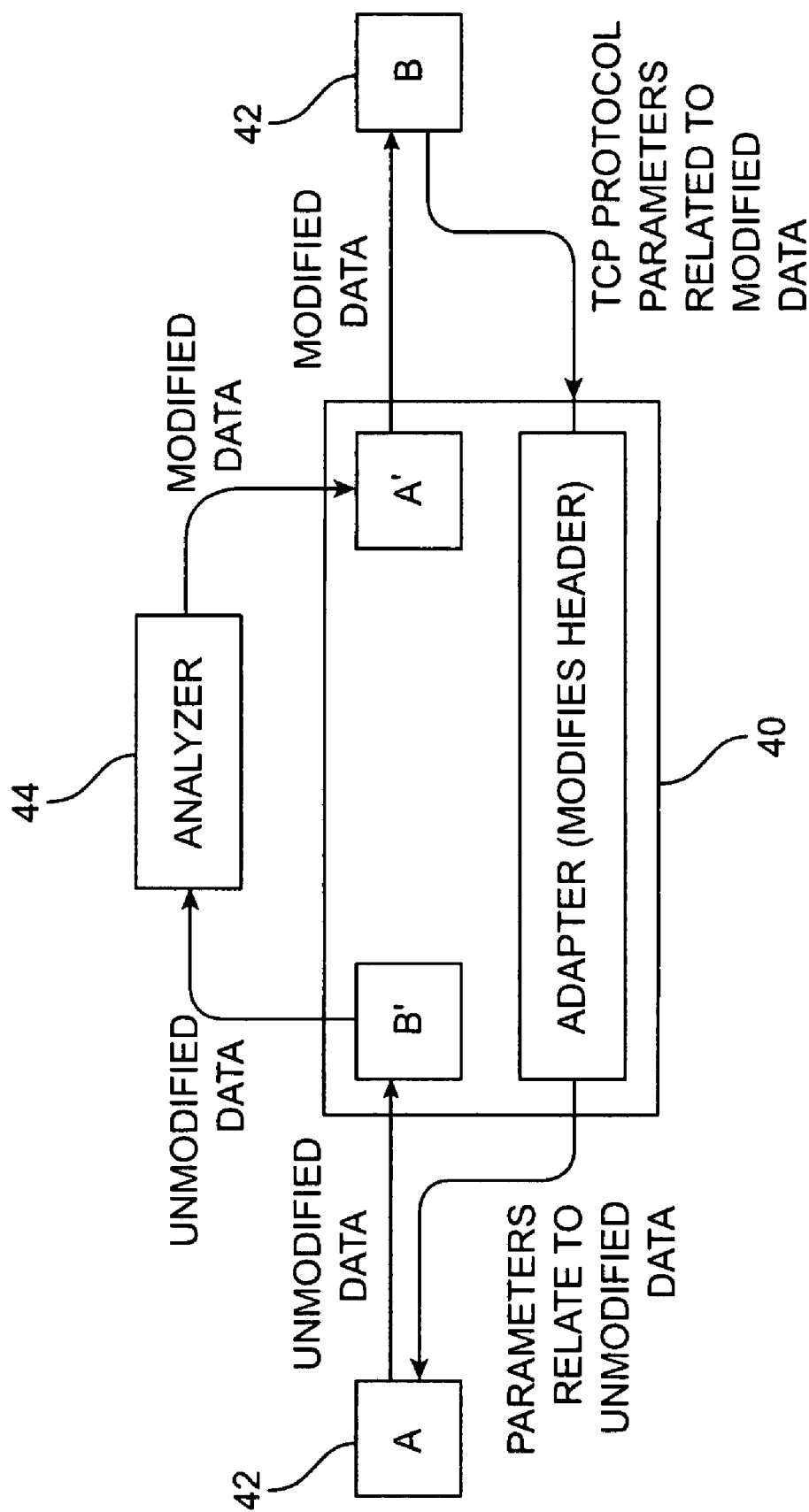
FIG. 18 is a diagram showing how intercepted TCP data is modified by an analyzer associated with a one-way proxy system in accordance with the present invention.

The need for TCP header modification by TCP adapter 56 is illustrated in FIG. 18. As shown in FIG. 18, TCP endpoint A sends unmodified data to one-way proxy system 40. The unmodified data is sent in the form of TCP packets. Each packet contains a TCP header containing information such as sequence number, time stamp information, etc. The unmodified data is received by receiver B'. Receiver B' passes the unmodified data to analyzer 44. Analyzer 44 performs processing on the data. Depending on the outcome of the processing operations, analyzer 44 may need to alter, delete, or insert TCP packets into the data stream. The modified data is provided to transmitter A'. As shown in FIG. 18, the modified data is transmitted by A' and is received by TCP endpoint B.

TCP endpoint B is not aware of the original unmodified data stream transmitted from A to B'. TCP endpoint B is only aware of the modified data stream received from A'. As a result, the TCP packets that B sends to one-way proxy system 40 are responsive to the modified data packets received from A', not the unmodified data packets originally transmitted by A. To ensure proper operation, one-way proxy system 40 uses TCP adapter 56 to alter the TCP headers of the packets received from B before these packets are forwarded to A. The TCP header information is modified so that the packets that A receives include parameters related to the original unmodified data sent from A to B', not parameters related to the modified data sent from A' to B.

Figure 19:
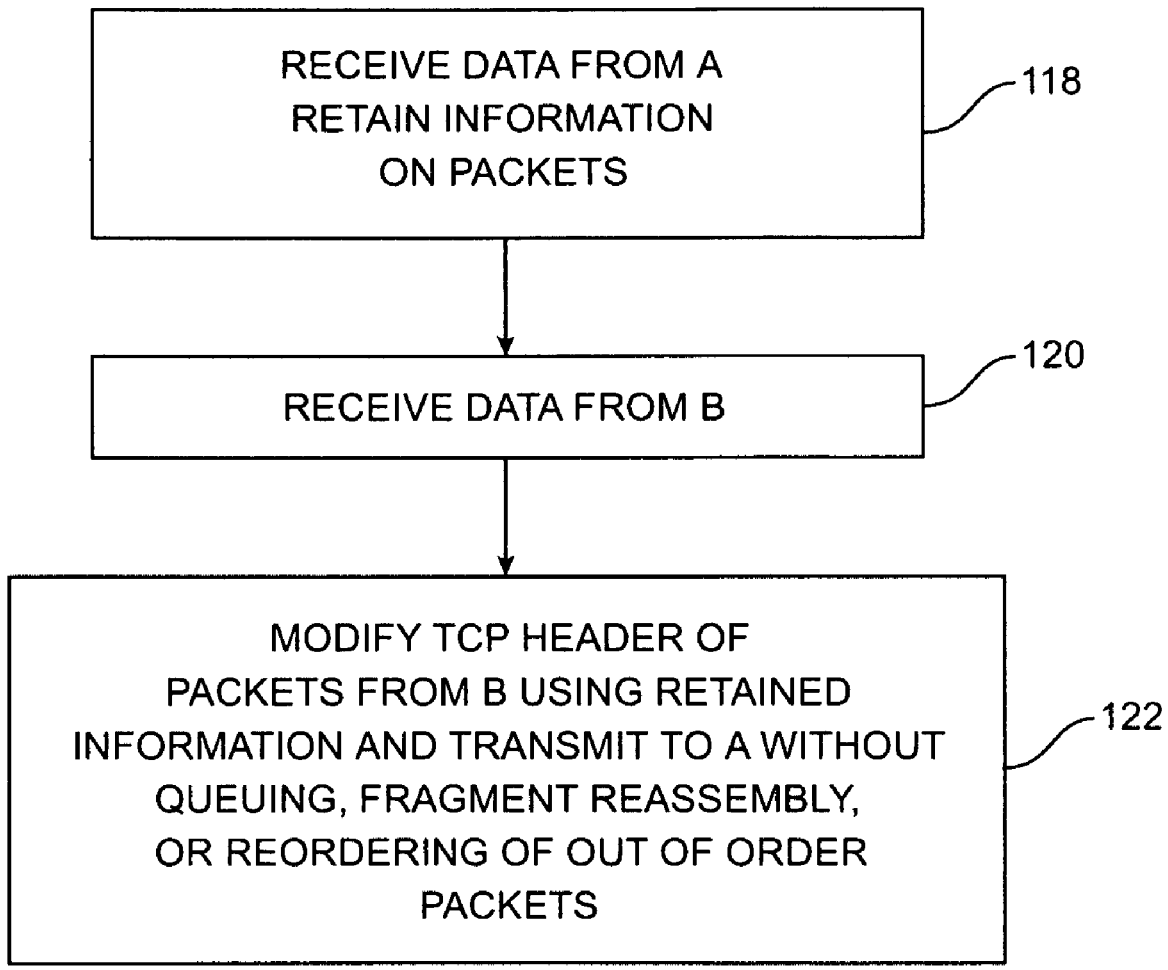
FIG. 19 is a flow chart of steps involved in modifying TCP header information with a TCP adapter in a one-way proxy system without performing operations such as queuing, fragment reassembly, or reordering of out-of-order packets in accordance with the present invention.

Illustrative steps involved in using one-way proxy system 40 to modify TCP header information are shown in FIG. 19.

At step 118, one-way proxy system 40 receives unmodified data from TCP endpoint A and retains information on the received packets (e.g., sequence number information, etc.). This information will be used in constructing appropriate packets to send from the one-way proxy to TCP endpoint A.

At step 120, the one-way proxy system receives TCP packets from TCP endpoint B. The TCP packets from B contain TCP header information that is responsive to the modified data stream transmitted from A' to B, as described in connection with FIG. 18.

At step 122, the TCP adapter uses the retained information from step 118 (e.g., retained sequence number information) to modify the TCP headers of the TCP packets received from TCP endpoint B. The TCP header parameters that are modified by the TCP adapter 56 include ACK, SACK, window size and checksum. These TCP header modifications are made by the TCP adapter 56 without performing queuing operations, fragment reassembly operations, or operations to reorder out of order packets. The TCP adapter 56 is therefore able to process the TCP packets without adding significant overhead. The modified packets are sent to TCP endpoint A. Because of the modifications performed to their TCP headers, the modified packets received at TCP endpoint A correctly correspond to the packets originally transmitted by TCP endpoint A.

Figure 20:
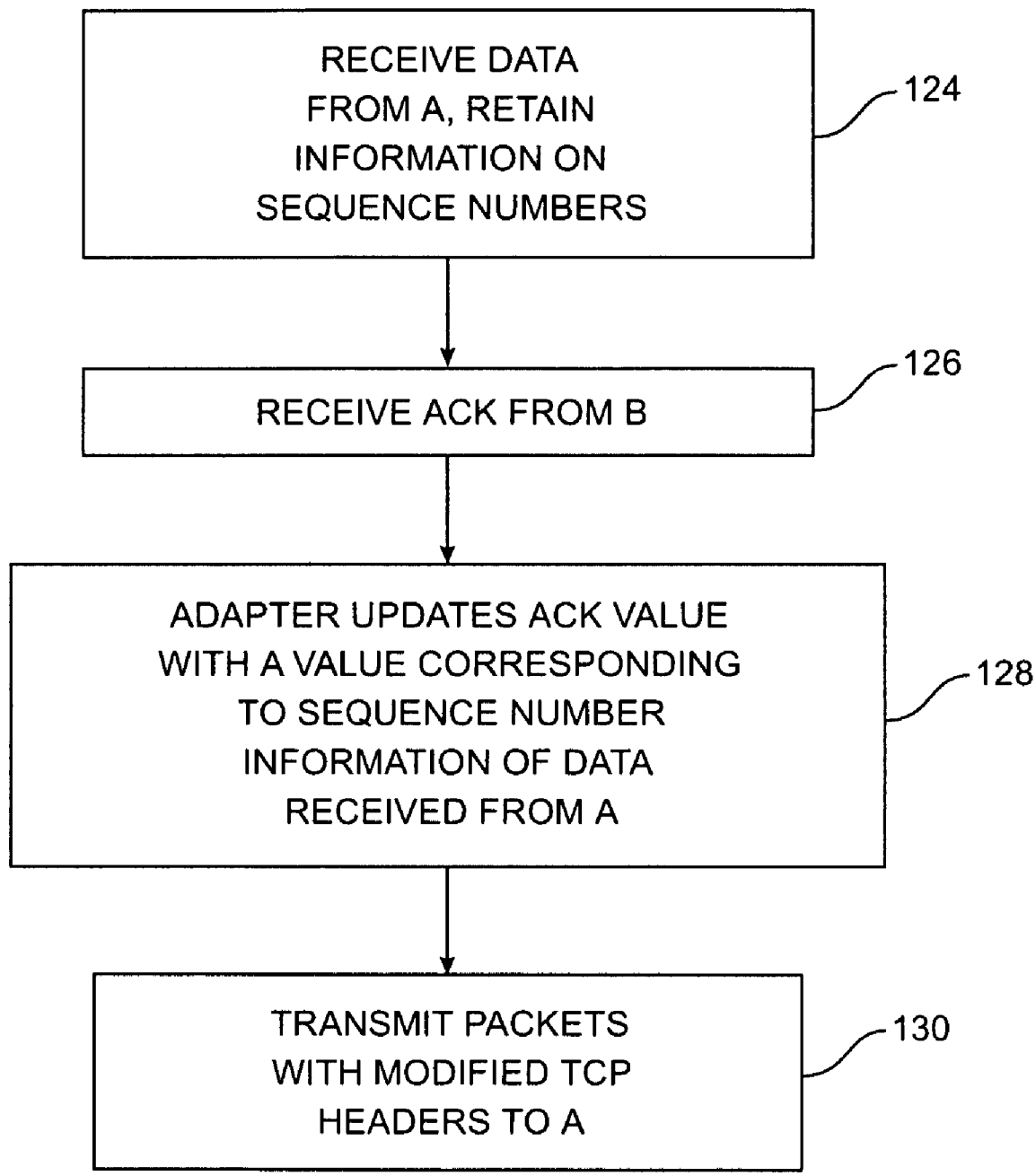
FIG. 20 is a flow chart of illustrative steps involved in using a TCP adapter in a one-way proxy system to modify an ACK in a TCP packet in accordance with the present invention.

Illustrative steps involved in using TCP adapter 56 to make ACK modifications to the TCP header are shown in FIG. 20.

At step 124, the one-way proxy system 40 of FIG. 3 uses receiver B' of TCP interceptor 50 to receive data transmitted over link 48 from TCP endpoint A. The one-way proxy system retains information on the TCP packets that are received such as sequence number information from the TCP headers of the received packets.

At some point during the operation of the link between A and B, B decides to issue an acknowledgement signal.

At step 126, the ACK from B is received by the one-way proxy system. The ACK is responsive to the modified data transmitted from A' to B and therefore needs to be modified to correspond to the unmodified data originally transmitted by A.

According to TCP, a proper ACK to a packet containing a sequence number of 1220 (as an example) is a packet containing an incremented sequence number (i.e., 1221). TCP adapter 56 uses the sequence number information that was retained at step 124 to create an appropriate ACK value for the modified TCP header at step 128. The modified TCP acknowledgement number corresponds to the sequence number of the original packet transmitted from A, not the sequence number of the packet received at B from A'. After TCP adapter 56 has updated the ACK value in the TCP header of the packet received from B to a value that corresponds to the sequence number of the packet originally sent from A, the packet with the modified TCP header is transmitted from the one-way proxy system 40 to TCP endpoint A (step 130). In this way, the ACK received at A will be appropriately configured and will serve as a proper ACK.

A SACK (selective acknowledgement) signal is an acknowledgement signal indicating that a particular portion of data has been successfully received. Unlike an ACK, which indicates that data reception has been completely successful, a SACK indicates that a portion of data has not been successfully received and should therefore be retransmitted. The SACK contains information identifying the portion of data to be retransmitted.

Figure 21:
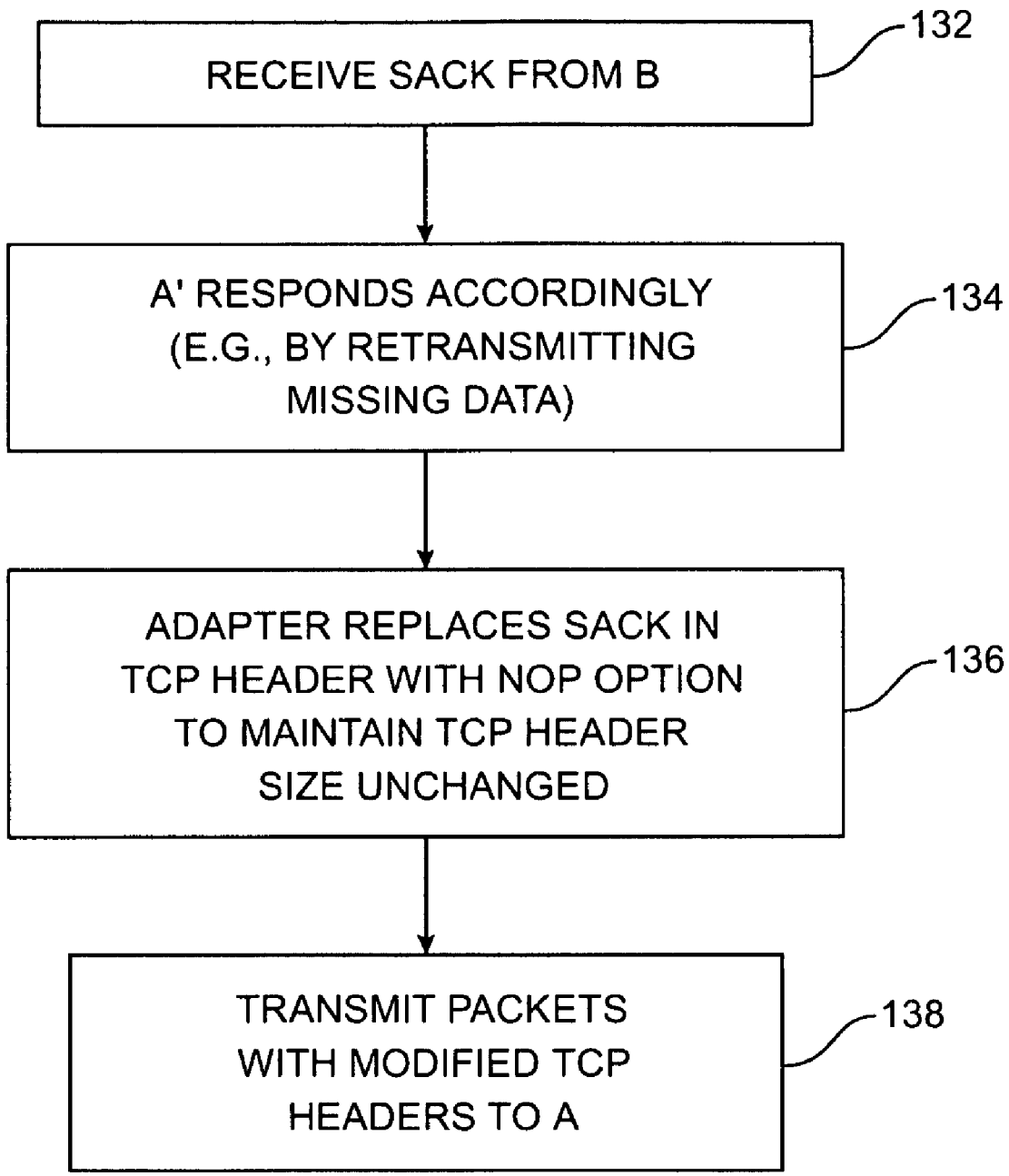
FIG. 21 is a flow chart of illustrative steps involved in using a TCP adapter in a one-way proxy system to modify a SACK in a TCP packet in accordance with the present invention.

Illustrative steps involved in modifying the TCP header in the data stream transmitted from B to A to accommodate selective acknowledgement signals (SACKs) are shown in FIG. 21.

At step 132, TCP adapter 56 of FIG. 3 receives a SACK from B. The SACK from B is in response to the modified data sent from A' to B (FIG. 18) and indicates that some data has been lost in the path between A' and B.

At step 134, the one-way proxy 40 responds to the SACK by retransmitting the missing data to TCP endpoint B.

At step 136, the TCP adapter 56 replaces the SACK from B in the TCP header with a NOP (no operation) option. Removal of the SACK from the data stream before the data stream is passed to TCP endpoint A prevents problems that would arise if A received the SACK and responded accordingly by retransmitting data to receiver B'. Inserting a NOP in place of the SACK ensures that the TCP header size remains unchanged. A benefit of this arrangement is that it is not necessary to shift payload data among IP (internet protocol) packets, which would require additional processing at TCP adapter 56 such as queuing and retransmission operations.

At step 138, the TCP packets in which the SACKs have been replaced with NOPs are transmitted from TCP adapter 56 to TCP endpoint A. TCP endpoint A receives the transmitted packets and ignores the NOPs.

Figure 22:
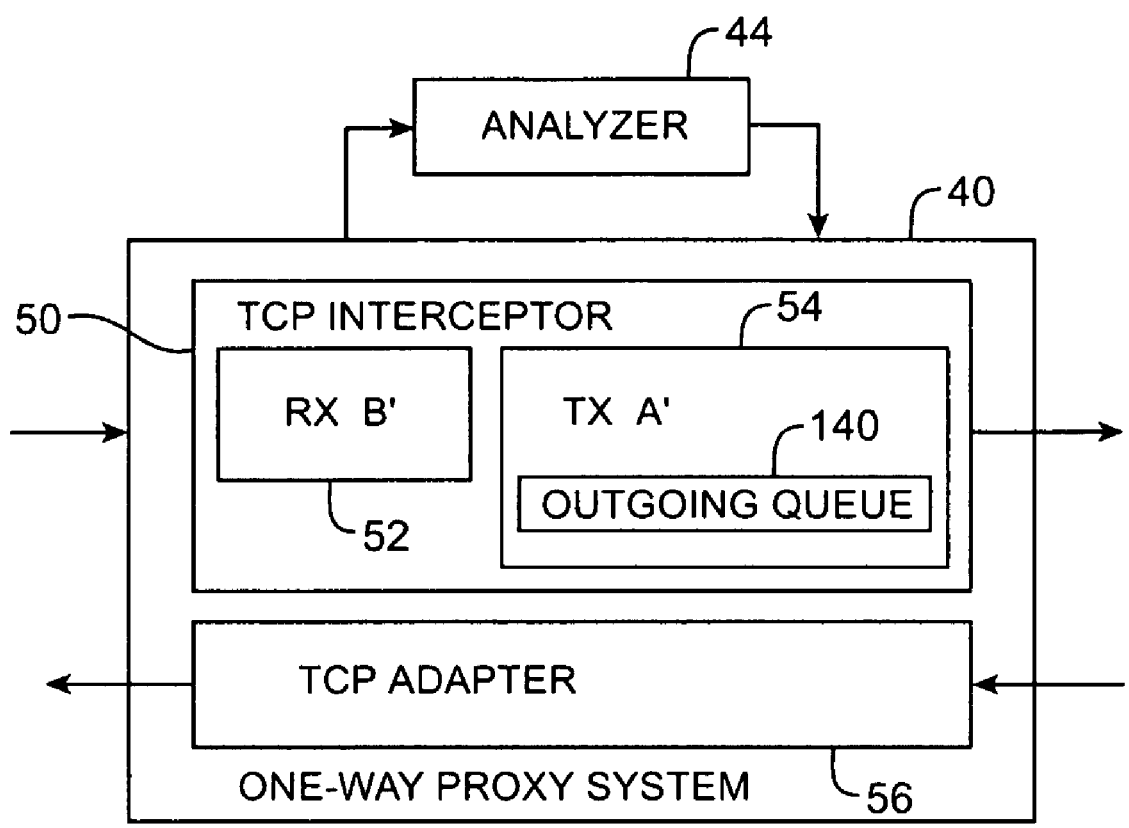
FIG. 22 is a diagram showing how a one-way proxy system may have an outgoing data queue that is monitored to determine whether the one-way proxy system should automatically create backpressure on an incoming data stream to relieve congestion in accordance with the present invention.

Sometimes analyzer 44 creates data more quickly than TCP endpoint B consumes data. This can create congestion between transmitter A' and TCP endpoint B. As shown in FIG. 22, transmitter A' has an outgoing queue 140. Queue 140 will become overly full in the presence of congestion. To relieve this congestion one-way proxy system 40 automatically creates backpressure to slow the transmission of data from TCP endpoint A. Slowing the data from endpoint A will allow queue 140 to empty and will relieve congestion between transmitter A' and TCP endpoint B. With the one-way proxy system 40, backpressure is created by exploiting TCP's window size parameter and does not require any modification to the analyzer 44.

Figure 23:
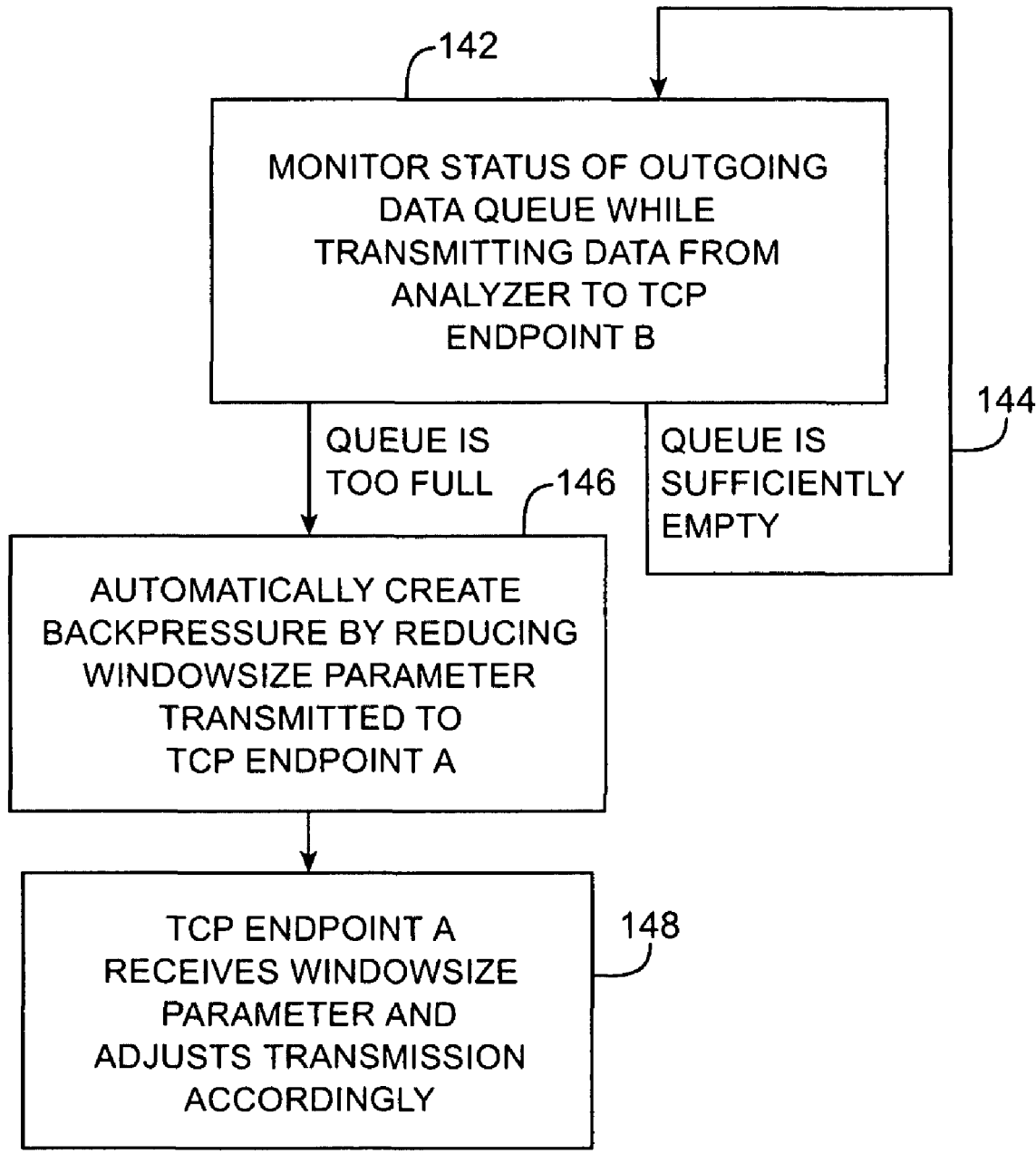
FIG. 23 is a flow chart of illustrative steps involved in using a TCP adapter in a one-way proxy system to modify a window size parameter in a TCP packet in accordance with the present invention.

Illustrative steps involved in using the window size parameter to create backpressure in the one-way proxy system of FIG. 3 are shown in FIG. 23.

At step 142, the one-way proxy system 40 monitors the status of outgoing data queue 140 in TCP interceptor 50 while using transmitter A' to transmit data from analyzer 44 to TCP endpoint B.

If the queue 140 is sufficiently empty (i.e., there is no congestion in the path from A' to B), processing continues at step 142, as indicated schematically by line 144.

If, however, it is determined that queue 140 is becoming too full, one-way proxy system 40 automatically creates backpressure by reducing the window size parameter in the packets being transmitted to TCP endpoint A (step 146). During step 146, the TCP adapter 56 modifies the TCP headers of the packets being transmitted from one-way proxy system 40 to TCP endpoint A so that their associated window size parameters are reduced.

The TCP packets with the reduced window size are received by TCP endpoint A at step 148, so that TCP endpoint A can adjust the transmission rate of data being sent from TCP endpoint A to one-way proxy system 40 accordingly.

The value of the window size parameter that is advertised to TCP endpoint A by one-way proxy system 40 controls the amount of data that TCP endpoint A transmits to one-way proxy system 40. For example, if the window size is set to 200, TCP endpoint A can conclude that one-way proxy system 40 has the capacity to receive 200 bytes of data. By reducing the window size parameter to 100, one-way proxy 40 can instruct TCP endpoint A to send less data. When the congestion between transmitter A' and TCP endpoint B has been relieved, the one-way proxy system 40 can adjust the widow size upwards to increase the flow of data.

In general, the value of the window size parameter that is transmitted to TCP endpoint A is based on factors such as local buffer availability to support the TCP session and system memory availability. If buffer space or system memory becomes constrained, the window size parameter can be adjusted downwards.

Figure 24:
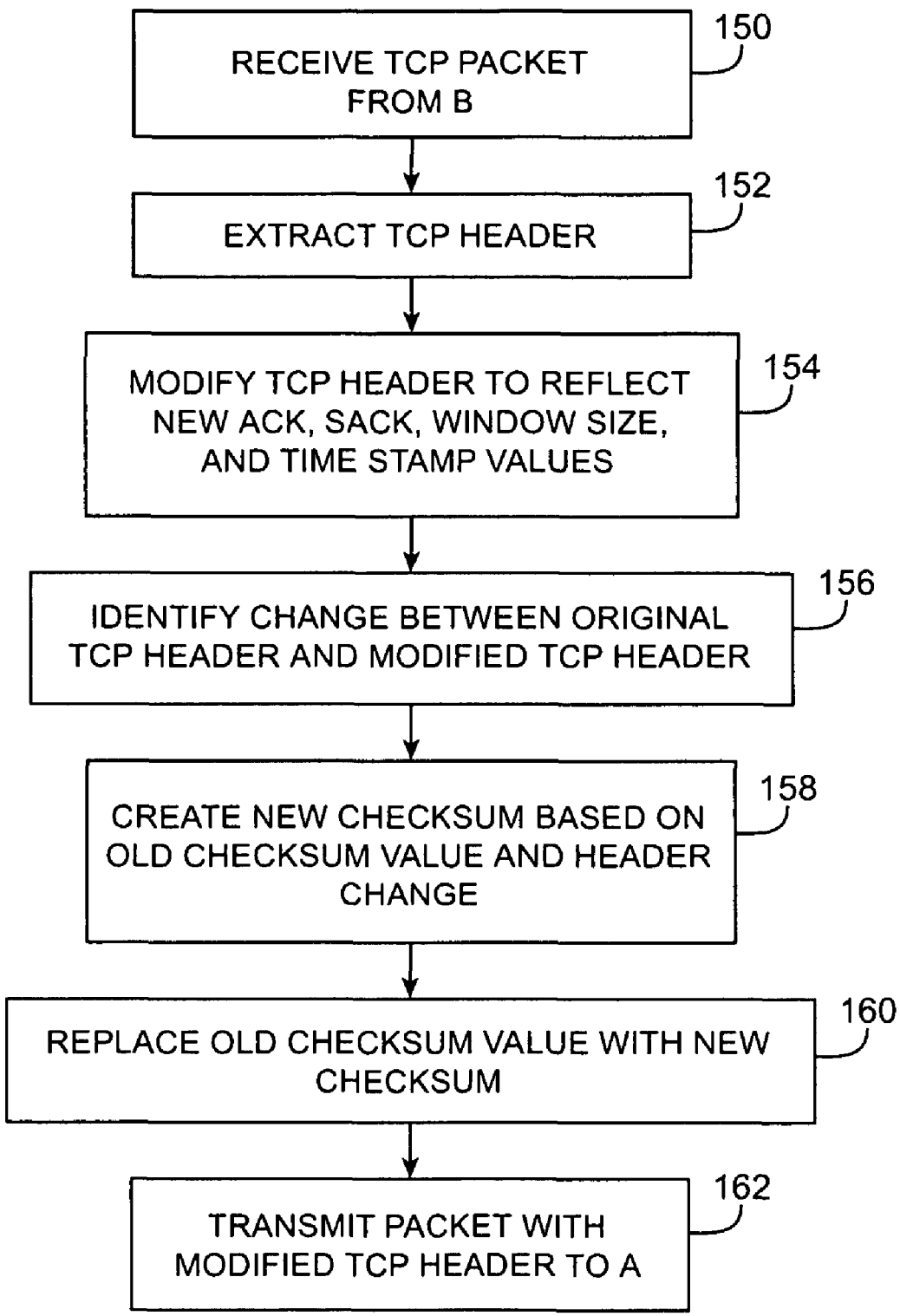
FIG. 24 is a flow chart of illustrative steps involved in using a TCP adapter in a one-way proxy system to modify a checksum value to reflect new ACK, SACK, and window size values in a TCP packet in accordance with the present invention.

TCP links use checksums as a form of error checking. If a checksum indicates that transmitted data has been corrupted, the affected data can be retransmitted. Illustrative steps involved in using TCP adapter 56 to modify the checksum values of the TCP packets flowing from B to A to reflect the TCP adapter's modifications to the packets (e.g., changes to window size, ACK, SACK, and time stamp) are shown in FIG. 24.

At step 150, the TCP adapter 56 receives a TCP packet from B. The TCP adapter 56 extracts the TCP header from the packet at step 152.

At step 154, the TCP adapter 56 modifies the TCP header of the packet as needed to create appropriate new ACK, SACK, window size and timestamp values.

These header modifications affect the appropriate checksum value for the TCP packet. Accordingly, at step 156, the TCP adapter 56 identifies the change between the original packet and the new packet and at step 158, the TCP adapter 56 calculates a new checksum based on the old checksum value and the identified header change.

At step 160, the TCP adapter 56 replaces the old checksum value with the newly calculated checksum value.

At step 162, the TCP adapter 56 transmits the packet with the modified TCP header and correct new checksum value to TCP endpoint A.

The system of FIG. 3 allows TCP options (time stamp, windows killing, SACK, MSS) and TCP properties (sequence number, ACK, window size, and checksum) to propagate through the one-way proxy 40 from A to B and from B to A.

TCP adapter 56 performs its data handling functions without reorganizing packets in sequence number order (no reordering), without queuing, and without handling retransmission of packets lost between TCP adapter 56 and TCP endpoint A, which is B's responsibility. Avoiding these tasks helps one-way proxy reduce overhead.

TCP interceptor 50 performs standard TCP functions at B' including fragment reassembly, generation of ACKs and SACKs in response to data received from TCP endpoint A, out-of-order packet rearrangement, overlay data handling, and flow control using the window size parameter. These functions are performed to support the TCP data stream from TCP endpoint A to receiver B'. At receiver B', the data stream is provided to analyzer 44 for processing. Following processing by analyzer 44, the data stream is provided back to TCP interceptor 50 and transmitter A' for transmission to TCP endpoint B. The functions performed at A' include data queuing using data queue 140 (FIG. 22) and sequence number modification/generation. During sequence number modification/generation, the sequence number of the packets is incremented by 1/byte as with regular TCP processing, but the initial sequence number is maintained the same as that for the packet received from TCP endpoint A, to ensure survival of the TCP session in case of a hardware bypass event. Other functions performed at A' include flow control (TCP interface 50 passes ACK, SACK, window size, and timestamp values copied from B' to A'), data retransmission, and congestion control.

The way in which TCP sessions are created and terminated in a one-way proxy environment of the type shown in FIG. 3 differs considerably from the way in which TCP session are created and terminated in a conventional TCP environment.

Figure 25:
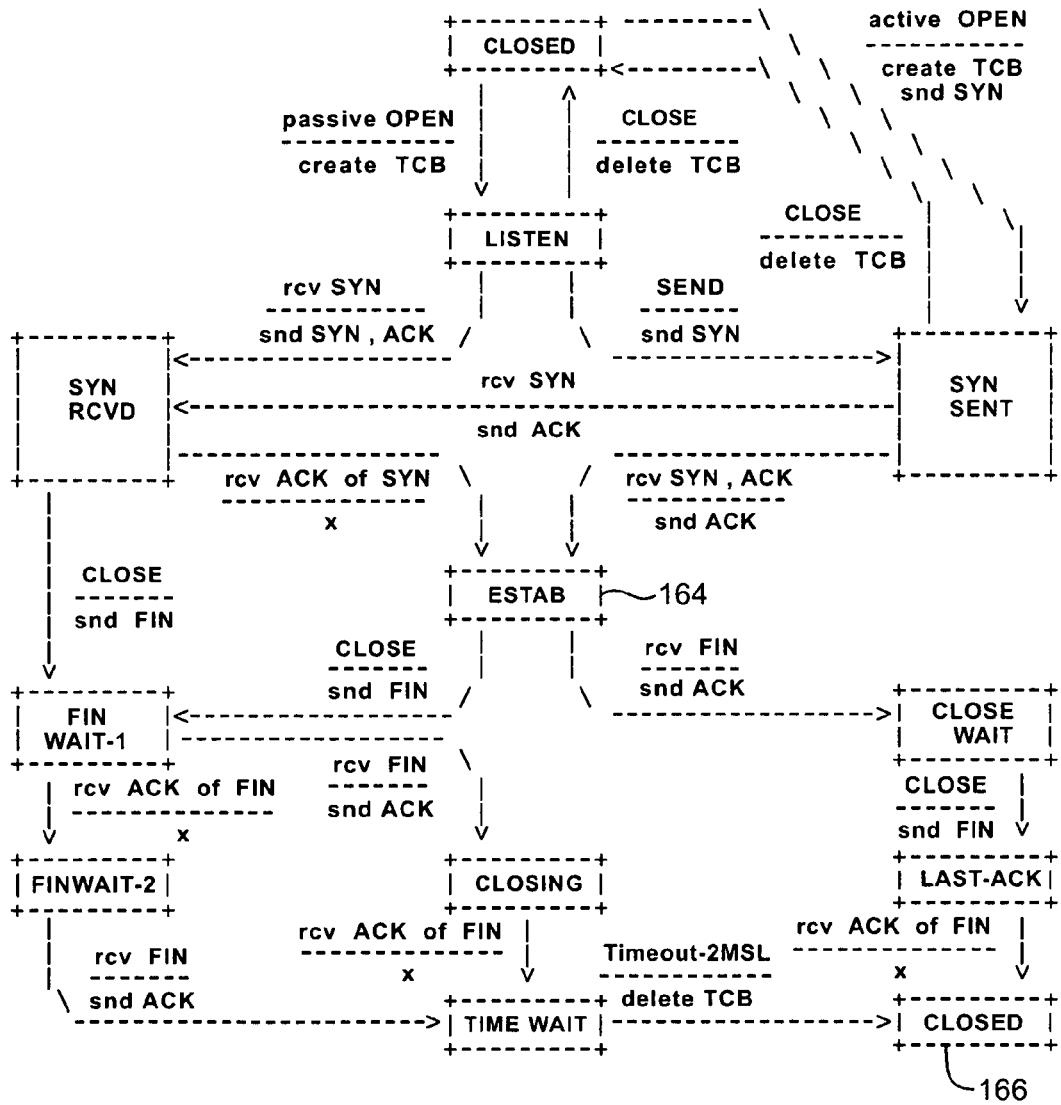
FIG. 25 is a state diagram showing how a conventional TCP session is established and terminated.

A state machine illustrating conventional TCP session creation and termination operations is shown in FIG. 25. The operations in the top portion of FIG. 25 are related to session creation. State 164 indicates a TCP session has been established. The operations in the bottom portion of FIG. 25 relate to session termination. State 166 indicates that the session has been terminated.

The conventional state machine of FIG. 25 is used for both the A/B' and A'/B TCP sessions in the conventional two-way proxy architecture of FIG. 2. With this approach, when either end of the TCP link tries to establish a connection with the other end, two sessions are created in succession. For example, consider the situation where A initiates a connection with B. Initially, a TCP session is established between A and proxy B'. Only after this first connection has been successfully established is an attempt made to establish a second TCP session between proxy A' and B. If the second connection succeeds, communications between A and B are established. If, however, the second TCP session is not successfully established, the TCP connection between A and proxy B' must be abruptly terminated, demonstrating that the original indications of successful link creation (due to the creation of the A to B' connection) were false.

With the one-way proxy architecture of FIG. 3, session creation is handled in a synchronized fashion in three steps—1) SYN, 2) SYN-ACK, and 3) ACK. SYN (sequence number) operations between A and B' are followed by SYN operations between A' and B. After SYN-ACK operations have been performed between B and A', SYN-ACK operations are performed between B' and A. Finally, ACK operations are completed between A and B' and between A' and B. With this arrangement, TCP endpoint A is not provided with a false notification of success. With the conventional two-way proxy approach, SYN, SYN-ACK, and ACK operations are initially performed between A and proxy B', without involving A' and B, which can lead to a false indication of success at TCP endpoint A. False indications of success can have undesirable consequences in the operation of application software using the associated TCP communications path and consume resources. Session termination operations are also performed differently in the one-way proxy environment.

Unlike the two independent conventional TCP state machines involved in the two-way proxy architecture of FIG. 2, there is a single unified one-way proxy system state machine involved in operating the one-way proxy system of FIG. 3. The one-way proxy system state machine exhibits different behaviors than the conventional TCP state machines. For example, when proxy A' receives a FIN from B in the conventional two-way proxy arrangement of FIG. 2, proxy A' sends a corresponding ACK. In the one-way proxy situation, the TCP adapter suppresses ACK generation and forwards the FIN to A without sending an ACK to B.

Figure 26:
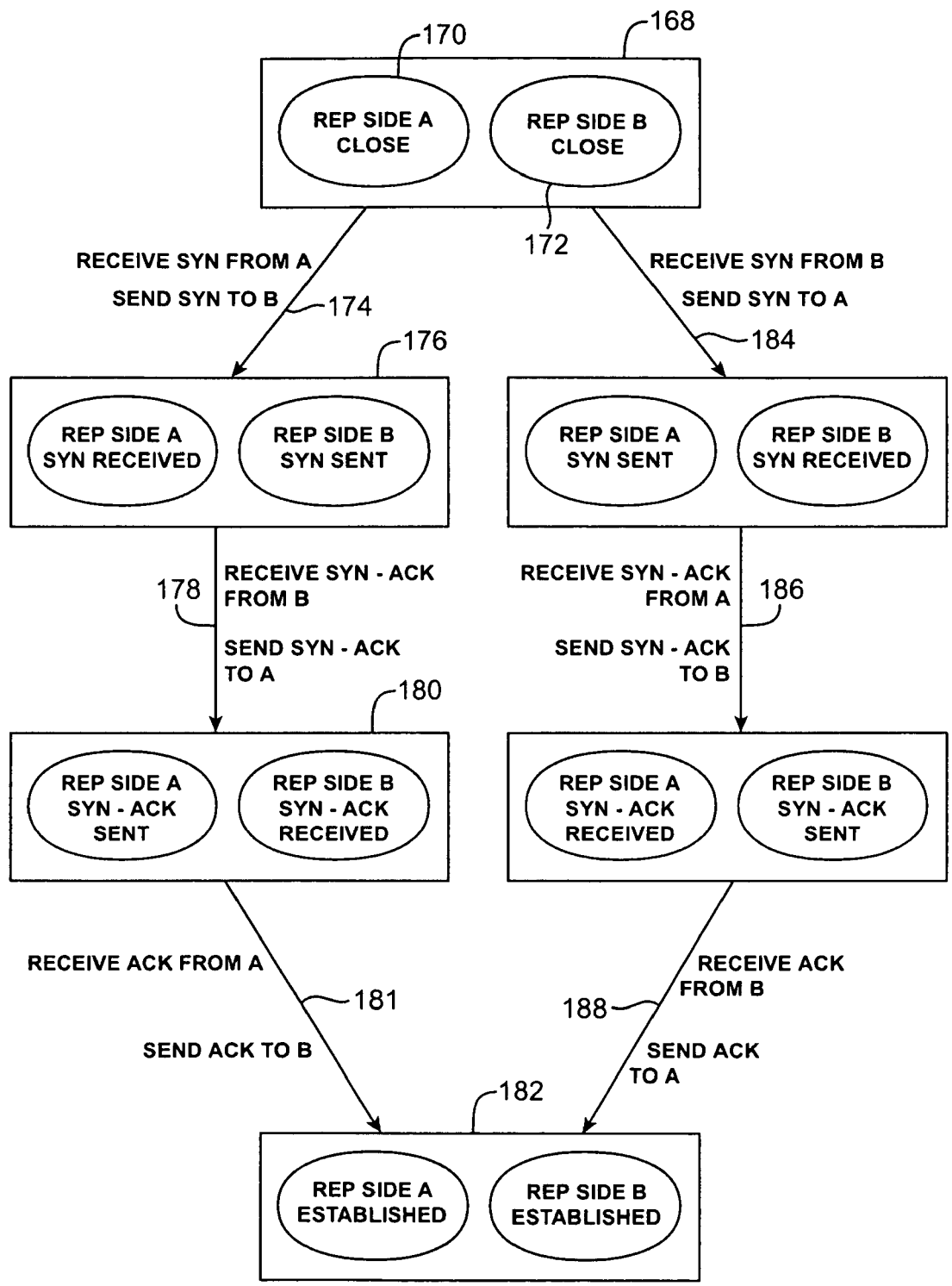
FIGS. 26, 27, and 28 contain a state diagram showing how a TCP session is established and terminated using a one-way proxy system in accordance with the present invention.
Figure 27:
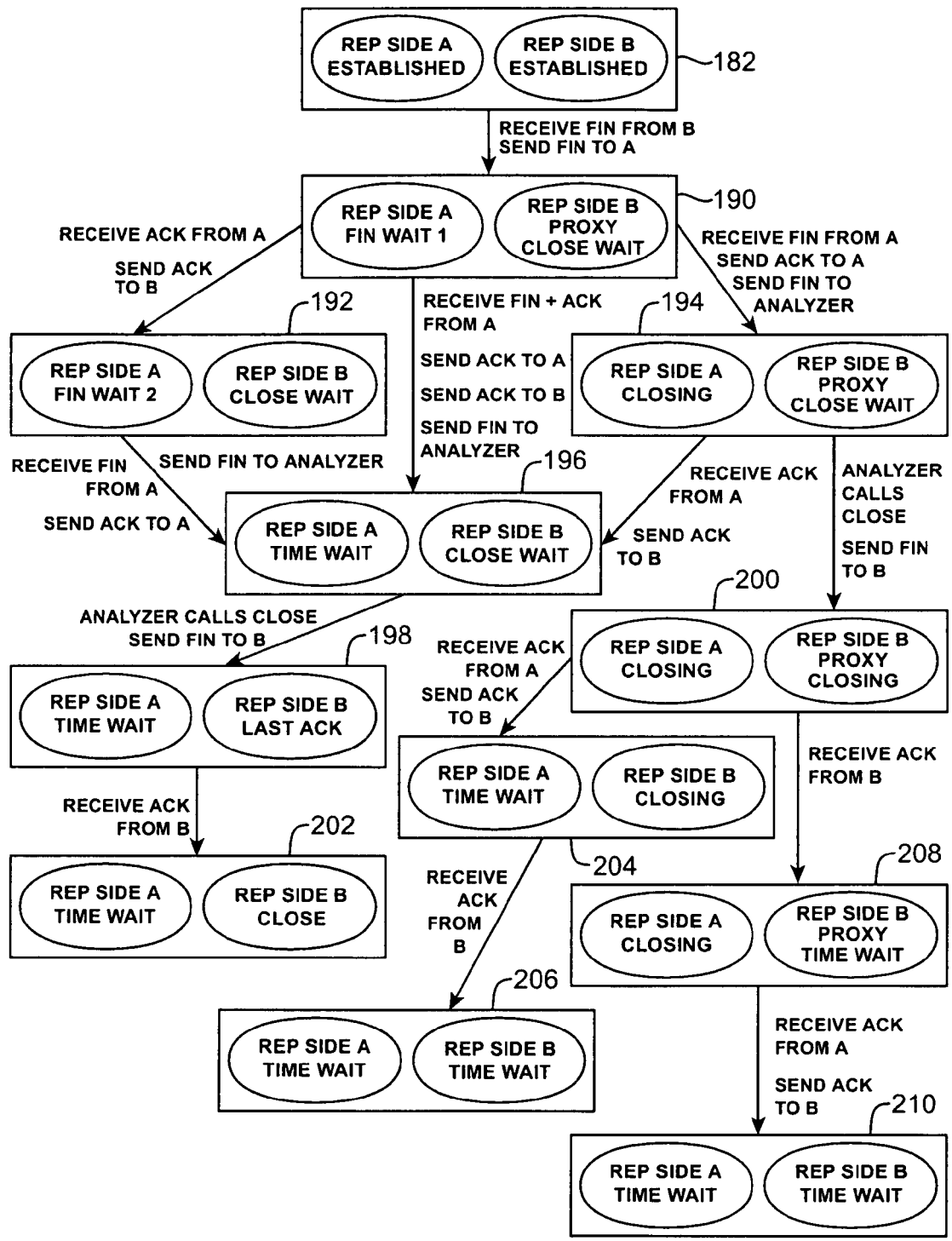
Figure 28:
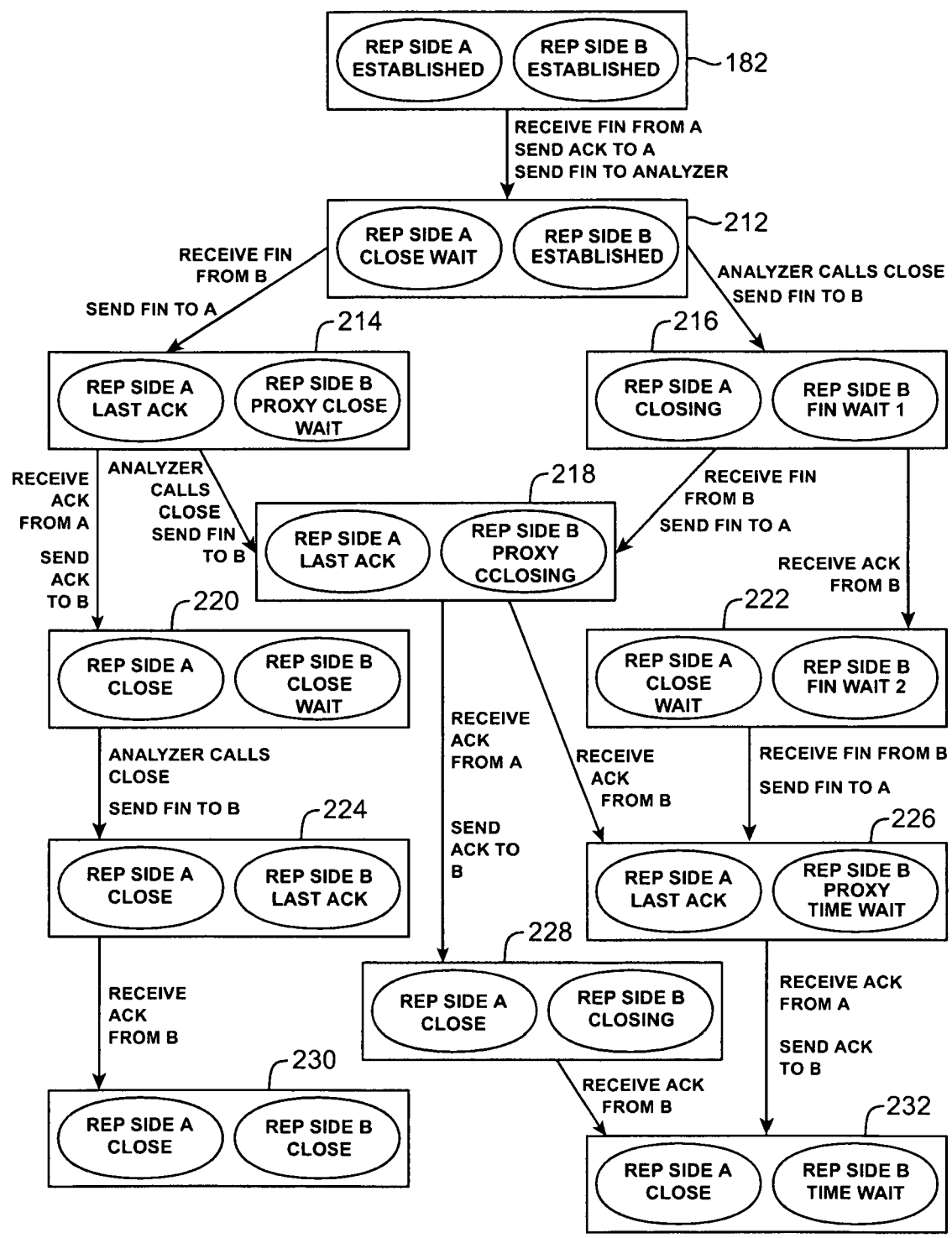

The unified one-way proxy state machine involved in operating the one-way proxy system of FIG. 3 is shown in FIGS. 26, 27, and 28. In these FIGS., the rectangular boxes and embedded ovals contains information on the states of the system. For example, in state 168 of FIG. 26, oval 170 indicates that the portion of one-way proxy system 40 that is shown as being adjacent to TCP endpoint A in FIG. 3 (called "rep side A") is in a "close" state. Similarly, oval 172 indicates that the portion of one-way proxy system 40 that is shown as being adjacent to TCP endpoint B in FIG. 3 (called "rep side B") is in a "close" state. This indicates that state 168 is an initial system state in which no session has been established and in which there is no system activity.

The lines between the boxes in the FIGS. indicate transitions between states. The annotations on the lines indicate the system activities that take place that cause these transitions. For example, line 174 in FIG. 26 indicates that TCP endpoint A is starting a TCP session. The annotations on line 174 indicate that this transition occurs when receiver B' of one-way proxy system 40 receives a SYN from TCP endpoint A and sends the SYN from A' to TCP endpoint B. The sequence number (SYN) that is received from TCP endpoint A is retained by the one-way proxy system. The same sequence number is transmitted to TCP endpoint B.

At step 176, the TCP session creation process has been initiated.

At state 180, B has sent an ACK in response to the SYN from A' and has sent its own SYN to A'. The term SYN-ACK in the FIGS. refers to the situation in which both a SYN and ACK have been sent.

Line 178 indicates how the adapter 56 passes through a SYN and an ACK to TCP endpoint A. The sequence number and acknowledgement number have the same values as the corresponding sequence number and acknowledgement number received from TCP endpoint B. In this way, the initial sequence number from A (associated with transition 174) and the initial sequence number from B (associated with transition 178) are retained by the system. This (along with the time stamp functions described in connection with FIGS. 6, 7, 9, and 10) provides fail close support for the one-way proxy system. In the event the system enters hardware bypass mode, the use of unmodified initial sequence numbers and appropriate time stamp values allows the TCP session to survive.

In states 176 and 180, all dependence on system parameters (e.g., sequence numbers) has been avoided. As indicated by line 181, the TCP session is established when the interceptor receives an ACK from A and passes it to B. This ACK was sent in response to the SYN received from B in connection with transition 178.

At state 182, the TCP session between A and B has been established. Data is flowing in both the A to B and the B to A directions.

Like line 174, which represents the path taken when A initiates the TCP session, line 184 indicates the path taken when B initiates the TCP session. During transition 186, the TCP interceptor 50 receives a SYN-ACK from A and passes it to TCP endpoint B. During transitions 184 and 186, the initial sequence numbers are retained as described in connection with transitions 174 and 178.

Line 188 shows how the final step in creating the B-initiated TCP session involves using TCP adapter 56 to receive an ACK from B and pass it to A.

At state 182, the TCP session has been established. Unlike the conventional two-way proxy architecture which permits false positives to arise, there is no possibility of a false positive situation in the state machine of FIG. 26, because it is necessary to establish a complete end to end link between TCP endpoint A and TCP endpoint B before reaching state 182. Moreover, the preservation of the SYN (sequence number) through the one-way proxy system 40 by passing the SYN through the one-way proxy system 40 unchanged during transitions 178 and 186 supports so-called "fail close" behavior in which the TCP session survives even in the event of a hardware bypass.

State 182 is shown at the bottom of FIG. 26 and is replicated at the tops of FIGS. 27 and 28. FIGS. 27 and 28 are state machine representations of the process of terminating the TCP session between TCP endpoints A and B using the one-way proxy system 40. FIG. 27 shows termination operations when termination is initiated by starting to close the B to A data stream. FIG. 28 shows termination operations when termination is initiated by starting to close the A to B stream.

In FIG. 27, state 190 represents the state of the FIG. 3 system when the B to A stream has been partly closed. In transitioning between state 182 and state 190, the adapter passes the same FIN to A that was received from B. no ACK is sent to B by the proxy system 40.

State 192 represents the state when the B to A stream has been completely closed. In the transition between states 190 and 192, the ACK is only sent to B after it has been received from A. In a conventional two-way proxy arrangement, proxy A' would have sent an ACK in direct response to a FIN from B. In the one-way proxy system, in contrast, the one-way proxy system 40 waits for the ACK from TCP endpoint A.

In state 194, the B to A stream has been partly closed and the A to B' stream has been completely closed.

In state 196, the B to A stream and the A to B' streams have been completely closed.

In state 198, the B to A stream and the A to B' stream are completely closed and the A' to B stream has been partly closed. In the transition between state 196 and 198, the analyzer 44 presents a CLOSE signal to indicate that data processing operations by the analyzer 44 are finished.

In state 202, all three streams have been completely closed and the TCP session between A and B has been terminated.

In state 200, the B to A stream has been partly closed. The A to B' stream has been closed and the A' to B stream has been partly closed.

In state 204, the B to A stream and A to B' stream have been closed. The A' to B stream has been partly closed.

In state 206, all three streams have been closed and the TCP session between A and B has been terminated.

In state 208, the B to A stream has been partly closed and the A to B' and A' to B streams have been closed.

In state 210, all three streams have been closed and the TCP session between A and B has been terminated.

FIG. 28 shows how the TCP session is terminated when termination is initiated by closing the A to B direction.

In state 212, a FIN has been received from A which has been passed to the analyzer. An ACK has been sent to A in response to the received FIN.

In state 214, the A to B' stream has been closed and the B to A stream has been partly closed.

In state 220, the A to B' direction has been closed and the B to A direction has been closed.

In state 224, the A to B' and the B to A streams remain closed. In addition, the A' to B stream has been partly closed.

In state 230 the A to B', the B to A, and the A' to B streams have all been closed.

In state 218, the A to B' stream has been closed. The B to A stream and the A' to B stream have been partly closed.

In state 228, the A to B' and the B to A streams have been closed. The A' to B stream has been partly closed.

In state 232, the A to B', the B to A, and the A' to B streams have all been closed.

In state 216, the A to B' stream has been closed and the A' to B stream has been partly closed.

In state 222, the A to B' stream has been closed and the A' to B stream has been closed.

In state 226, the A to B' and the A' to B streams have been closed. The B to A stream has been partly closed.

In state 232, the A to B' stream, the B to A stream, and the A' to B stream have all been closed.

The survival of TCP sessions in the event of hardware bypass has been described earlier in the context of retaining initial sequence numbers and the processing of timestamp TCP options in a one-way proxy system. If desired, these mechanisms can be used in a two-way proxy system to support the survivability of TCP sessions in the event of a hardware bypass.

Unlike a complex two-way proxy system which must maintain two directions of closure and which must read and write all data in both directions flowing through the two-way proxy system even if only one direction of data is analyzed, the one-way proxy system of the present invention passes many TCP options and properties through system 40 either unchanged or modified in a way that makes the one-way proxy transparent. The present invention therefore eliminates much of the overhead associated with conventional systems to improve system efficiency, while improving reliability by providing fail close support.

The foregoing is merely illustrative of the principles of this invention and various modifications can be made by those skilled in the art without departing from the scope and spirit of the invention.

What is claimed is:

1. A method of operating an inline network appliance, the method comprising:

intercepting data traffic flowing in a given transport control protocol (TCP) session between a first TCP endpoint and a second TCP endpoint for processing by a one-way analyzer;

receiving first data traffic of the given TCP session from the first TCP endpoint with the inline network appliance;

providing the received first data traffic from the first TCP endpoint to the one-way analyzer for processing and receiving corresponding processed data traffic from the one-way analyzer;

transmitting the first data traffic that has been processed by the one-way analyzer from the inline network appliance to the second TCP endpoint in the given TCP session;

receiving second data traffic in the given TCP session from the second TCP endpoint at the inline network appliance in the given TCP session;

processing the received second data traffic at the inline network appliance including modifying TCP acknowledgement numbers in the received data traffic at the inline network appliance in the given TCP session, wherein the processing the received second data traffic at the inline network appliance comprises processing the received second data traffic at the inline network appliance without at least one of:

reordering out of order packets in the received second data traffic at the inline network appliance;

queuing the received second data traffic at the inline network appliance; and performing fragment reassembly operations on the received second data traffic at the inline network appliance; and transmitting the second data traffic containing the modified TCP acknowledgement numbers to the first TCP endpoint in the given TCP session.

2. The method defined in claim 1, further comprising:

receiving a FIN signal from the second TCP endpoint at the inline network appliance and forwarding the FIN signal from the inline network appliance to the first TCP endpoint, wherein the FIN signal is not acknowledged to the second TCP endpoint by the inline network appliance; and passing an acknowledgement that has been generated by the first TCP endpoint in response to the FIN signal to the second TCP endpoint.

3. The method defined in claim 1 further comprising acknowledging data received from the second TCP endpoint at the inline network appliance only by passing acknowledgements to the second TCP endpoint that have been received from the first TCP endpoint.

4. The method defined in claim 1, wherein the processing the received second data traffic at the inline network appliance includes processing the received second data traffic at the inline network appliance without reordering out of order packets in the received second data traffic at the inline network appliance.

5. The method defined in claim 1, wherein the processing the received second data traffic at the inline network appliance includes processing the received second data traffic at the inline network appliance without queuing the received second data traffic at the inline network appliance.

6. The method defined in claim 1, wherein the processing the received second data traffic at the inline network appliance includes processing the received second data traffic at the inline network appliance without performing fragment reassembly operations on the received second data traffic at the inline network appliance.

7. The method defined in claim 1, wherein the first data traffic received from the first TCP endpoint includes TCP packets and wherein the one-way analyzer processes the packets and inserts additional packets, and wherein the one-way analyzer provides the processed and inserted packets to a transmitter at the inline network appliance, the method further comprising:

using the transmitter to provide time stamp values to the processed and inserted packets that pass a prevention against wrapped sequence (PAWS) check performed at the second TCP endpoint.

8. The method defined in claim 1, further comprising:

retaining sequence number information in the first data traffic of the given TCP session from the first TCP endpoint at the inline network appliance;

receiving an acknowledgement number from the second TCP endpoint in the given TCP session;

updating the acknowledgement number received from the second TCP endpoint with a value corresponding to the retained sequence number information from the first data traffic received from first TCP endpoint at the inline network appliance; and transmitting a TCP packet containing the updated acknowledgement number to the first TCP endpoint from the inline network appliance.

9. The method defined in claim 1, further comprising:

receiving at the inline network appliance a TCP packet containing a selective acknowledgement (SACK) from the second TCP endpoint;

responding to the SACK by retransmitting missing data to the second TCP endpoint from the inline network appliance;

replacing the SACK in the received TCP packet with a no operation (NOP) at the inline network appliance; and transmitting the TCP packet with the NOP to the first TCP endpoint.

10. The method defined in claim 1, further comprising using the inline network appliance to adjust a window size parameter in the second data traffic that is being transmitted to the first TCP endpoint.

11. The method defined in claim 1, wherein the inline network appliance contains an outgoing data queue in which TCP packets associated with the transmitted first data traffic are queued, the method further comprising:

monitoring the outgoing data queue while transmitting the first data traffic to the second TCP endpoint; and if the outgoing data queue is determined as being too full, automatically creating backpressure by reducing a widow size parameter in the second data traffic that is being transmitted to the first TCP endpoint.

12. The method defined in claim 1, further comprising:

extracting a TCP header from a TCP packet in the second data traffic received from the second TCP endpoint;

modifying the TCP header;

identifying a change between the TCP header and the modified TCP header;

calculating a new checksum based on an old checksum value associated with the TCP packet and the identified change;

replacing the old checksum value with the new checksum in the TCP packet; and transmitting the TCP packet with the new checksum to the first TCP endpoint.

13. An appliance, comprising:

an inline network appliance that intercepts data flowing in a single transport control protocol (TCP) session between a first TCP endpoint and a second TCP endpoint for processing by a one-way analyzer;

a TCP receiver that receives first data traffic from the first TCP endpoint, validates TCP headers, reorders out-of-order packets, and provides the first data traffic to the one-way analyzer;

a TCP transmitter that transmits the first data traffic to the second TCP endpoint after processing by the one-way analyzer; and a TCP adapter that receives second data traffic from the second TCP endpoint, modifies TCP packet headers in the second data traffic, and transmits the second data traffic with the modified TCP packet headers to the first TCP endpoint, wherein the TCP adapter does not perform at least one of:

reordering out of order packets in the received second data traffic at the inline network appliance;

queuing the received second data traffic at the inline network appliance; and performing fragment reassembly operations on the received second data traffic at the inline network appliance.

14. The inline network appliance of claim 13, wherein the TCP adapter does not perform reordering out of order packets in the received second data traffic.

15. The inline network appliance of claim 13, wherein the TCP adapter does not perform queuing the received second data traffic.

16. The inline network appliance of claim 13, wherein the TCP adapter does not perform fragment reassembly operations on the received second data traffic.

17. A method, for operating an inline appliance, comprising:
- intercepting data flowing in a single transport control protocol (TCP) session between a first TCP endpoint and a second TCP endpoint for processing by an analyzer so that the TCP session survives in the event of a hardware bypass, wherein the inline network appliance has a hardware bypass switch through which the data is directed when the inline network appliance enters hardware bypass mode;
- in establishing the TCP session, receiving a TCP SYN packet for the TCP session from one of the first and second TCP endpoints;
- in establishing the TCP session, transmitting the received TCP SYN packet to an other of the first and second TCP endpoints;
- after the TCP session has been established, receiving first data traffic from the first TCP endpoint and providing the received first data traffic to the analyzer for processing;
- retaining the highest time stamp value that has been received in the first data traffic from the first TCP endpoint;
- receiving the processed first data traffic from the analyzer and transmitting the processed first data traffic to the second TCP endpoint in TCP data packets that use the retained time stamp value;
- receiving second data traffic from the second TCP endpoint; and
- processing the received second data traffic at the inline network appliance, wherein the processing the received second data traffic at the inline network appliance includes processing the received second data traffic at the inline network appliance without at least one of:
  - reordering out of order packets in the received second data traffic at the inline network appliance;
  - queuing the received second data traffic at the inline network appliance; and
  - performing fragment reassembly operations on the received second data traffic at the inline network appliance.

18. The method of claim 17, wherein the processing the received second data traffic at the inline network appliance includes processing the received second data traffic at the inline network appliance without reordering out of order packets in the received second data traffic at the inline network appliance.

19. The method of claim 17, wherein the processing the received second data traffic at the inline network appliance includes processing the received second data traffic at the inline network appliance without queuing the received second data traffic at the inline network appliance.

20. The method of claim 17, wherein the processing the received second data traffic at the inline network appliance includes processing the received second data traffic at the inline network appliance without performing fragment reassembly operations on the received second data traffic at the inline network appliance.

* * * * *